United States Patent [19]
Takeuchi et al.

[11] Patent Number: 5,978,600
[45] Date of Patent: Nov. 2, 1999

[54] MOTION COMPENSATION DEVICE TO COMPENSATE FOR MOTION OF AN OPTICAL SYSTEM WITHOUT USING MOTION SENSORS

[75] Inventors: Hiroshi Takeuchi; Kazutoshi Usui, both of Kawasaki, Japan

[73] Assignee: Nikon Corporation, Tokyo, Japan

[21] Appl. No.: 09/163,436

[22] Filed: Sep. 30, 1998

[30] Foreign Application Priority Data

Sep. 30, 1997 [JP] Japan ..................................... 9-265995
Feb. 17, 1998 [JP] Japan ................................. 10-034572
Feb. 17, 1998 [JP] Japan ................................. 10-034586

[51] Int. Cl.$^6$ ........................... G03B 17/00; G02B 27/64
[52] U.S. Cl. ............................................... 396/53; 396/55
[58] Field of Search ..................... 396/53, 55; 348/208; 359/554

[56] References Cited

U.S. PATENT DOCUMENTS 5,095,198 3/1992 Nakazawa et al. ................... 396/55 X
5,652,918 7/1997 Usui ......................................... 396/55

Primary Examiner—W. B. Perkey

[57] ABSTRACT

A motion compensation device having a motion compensation lens which moves to compensate for motion caused by, e.g, hand shake, to prevent blur of an image formed on an image forming plane. An actuator drives the motion compensation lens and when the motion compensation lens moves, a drive current flows in a coil of the actuator. A drive current measuring device measures the drive current. An ideal drive current calculating unit calculates an ideal drive current when the motion compensation lens receives no acceleration. The ideal drive current calculating unit includes a virtual actuator. The virtual actuator is a model of an actuator which behaves similarly to the actual actuator. The ideal drive current calculating unit calculates the ideal drive current for the state in which there is no acceleration caused by hand shake. A position instruction value calculating unit finds a value proportional to the hand shake acceleration by comparing the drive current measured by the drive current measuring device with the ideal drive current calculated by the ideal drive current calculating unit. The position instruction value calculating unit calculates a drive amount (target position signal) of the motion compensation lens which is necessary in order to compensate the motion.

45 Claims, 13 Drawing Sheets

MOTION COMPENSATION DEVICE TO COMPENSATE FOR MOTION OF AN OPTICAL SYSTEM WITHOUT USING MOTION SENSORS

CROSS-REFERENCE TO RELATED APPLICATIONS

This application is based upon and claims priority of Japanese Patent Applications Nos. 09-265995 filed Sep. 30, 1997, 10-034572 filed Feb. 17, 1998 and 10-034586 filed Feb. 17, 1998, the contents being incorporated herein by reference.

BACKGROUND OF THE INVENTION

1. Field of the Invention

The present invention relates to a motion compensation device which compensates for motion caused by hand shake and the like in a camera or other optical device. More particularly, the present invention relates to a motion compensation device which compensates for motion of an image on an image forming plane without using special sensors, such as angular velocity sensors, to detect motion.

2. Description of the Related Art

Cameras having motion compensation devices are known. A conventional motion compensation device compensates for motion causing blurring of an image on an imaging plane, which occurs as a result of vibration of the camera during photography, by driving a motion compensation optical system (referred to hereinbelow as "motion compensation lens") which constitutes a portion of a photographic optical system.

The conventional motion compensation device detects hand shake with angular velocity sensors or acceleration sensors, or the like, and calculates a drive signal based on the detected hand shake. The conventional motion compensation lens is supported such that movement at approximately right angles to the optical axis is possible. An actuator drives the motion compensation lens, based on the drive signal, in a direction which cancels the motion causing blur of an image formed in the imaging plane (e.g., a film plane).

The motions of the camera which are the origin of image blur during photography are pitching, yawing and rolling motion, motion parallel to the vertical, motion parallel to the horizontal, and the like. Pitching and yawing motion are so-called angular motion. When photographing at long range, and when the lens focal distance is long, pitching and yawing motion have the effect of producing large motion of an image on the imaging plane (film plane) relative to the optical axis, and, as a result, a large amount of image blur in the imaging plane. Because angular motion is motion producing an angular velocity, the conventional motion compensation device determines the motion angle caused by pitching and yawing motion using two angular velocity sensors respectively detecting angular velocity in two axial directions, and by integrating the output signals of the angular velocity sensors. The motion compensation lens is then driven to cancel the movement of the optical axis accompanying the movement of the camera to prevent movement of the image in the film plane. Many prior art motion compensation devices compensate only the effects of pitching and yawing in the above-described manner.

A conventional motion compensation device requires angular velocity sensors or the like sensors in order to detect motion. However, angular velocity sensors and the like are expensive sensors. Therefore, a problem arises in that cameras and other optical instruments having a motion compensation device are expensive.

SUMMARY OF THE INVENTION

It is an object of the present invention to provide a motion compensation device which can compensate for motion causing blur of an image formed on an imaging plane with high accuracy, and without using special sensors to detect motion.

Objects and advantages of the present invention are achieved in accordance with a first preferred embodiment of the invention with a motion compensation device, comprising a motion compensation optical system to compensate for motion causing image blur; a drive unit to drive the motion compensation optical system; a drive signal detection unit to detect a drive signal when the motion compensation optical system receives an acceleration caused by motion; and a control unit to control the drive unit based on the drive signal.

In accordance with the first preferred embodiment of the present invention, the drive unit is a drive force generating device to generate a drive force by flowing an electric current through a magnetic field, and the drive signal detection unit detects the electric current as the drive signal when the motion compensation optical system receives an acceleration caused by motion.

In accordance with the first preferred embodiment of the present invention, the motion compensation device further comprises a calculating unit to calculate a target drive position of the motion compensation optical system based on the drive signal and to output a target drive position signal, wherein the calculating unit controls the drive unit based on the target drive position signal.

In accordance with the first preferred embodiment of the invention, the calculating unit comprises a first calculating unit to calculate the target drive position of the motion compensation optical system and to output the target drive position signal; and a second calculating unit to calculate an ideal drive signal of the motion compensation optical system and to output the ideal drive signal, wherein the first calculating unit calculates the target drive position signal based on the drive signal and the ideal drive signal.

In accordance with the first preferred embodiment of the invention, the first calculating unit calculates the acceleration of the motion compensation optical system based on the drive signal and the ideal drive signal.

In accordance with the first preferred embodiment of the invention, the second calculating unit outputs, as the ideal drive signal, the current when the motion compensation optical system does not receive an acceleration due to motion, and the first calculating unit calculates the acceleration of the motion compensation optical system from the difference between the drive signal and the ideal drive signal.

In accordance with the first preferred embodiment of the invention, the calculating unit calculates the target drive position signal according to the movement of the motion compensation optical system in the optical axis direction.

In accordance with the first preferred embodiment of the invention, the calculating unit calculates the target drive position signal according to a distance between a center of rotation of motion and a position of the motion compensation optical system in the optical axis direction.

In accordance with the first preferred embodiment of the invention, the center of rotation of motion is positioned between a centroid of the motion compensation optical system and the imaging plane.

In accordance with the first preferred embodiment of the invention, the calculating unit calculates the target drive position signal according to the photographic range.

Objects and advantages of the present invention are achieved in accordance with a second preferred embodiment of the present invention with a motion compensation device, comprising a motion compensation optical system to compensate for motion causing image blur; a drive unit to drive the motion compensation optical system; a drive signal detection unit to detect a drive signal when the motion compensation optical system receives acceleration caused by the motion causing image blur; an ideal drive signal calculating unit to calculate an ideal drive signal when the motion compensation optical system receives an acceleration caused by the motion causing image blur; a position instruction value calculating unit to calculate a position instruction value based on the drive signal and the ideal drive signal; a control unit to control the drive unit based on the position instruction value; and a memory unit to store at least one of constants and coefficients to calculate the ideal drive signal, wherein the ideal drive signal calculating unit calculates the ideal drive signal based on at least one of the constants and coefficients and the position instruction value.

In accordance with the second preferred embodiment of the invention, the memory unit stores characteristic angular vibration constants, attenuation constants, and drive performance constants relating to the drive unit.

In accordance with the second preferred embodiment of the invention, the motion compensation device further comprises a temperature detection unit to detect the temperature, wherein the memory unit stores temperature compensation coefficients, and the ideal drive signal calculating unit calculates the ideal drive signal, and corrects at least one of the constants and the coefficients, based on the temperature detected by the temperature detection unit and the temperature compensation coefficient.

In accordance with the second preferred embodiment of the present invention, the memory unit stores coefficients relating to the frequency characteristics of the ideal drive signal calculating unit. Moreover, the memory unit may be a rewriteable memory element.

In accordance with the second preferred embodiment of the present invention, the motion compensation device further comprises a filter unit to remove from the drive signal, signals arising when the motion compensation optical system receives gravitational acceleration, wherein the position instruction value calculating unit calculates the position instruction value based on the output signal of the filter unit and on the ideal drive signal.

In accordance with the second preferred embodiment of the present invention, the filter unit may be a DC elimination filter to remove the direct current component, including an A/D converter to A/D convert the output signal of the DC elimination filter, wherein the position instruction value calculating unit calculates the position instruction value based on the output signal of the A/D converter and on the ideal drive signal.

In accordance with the second preferred embodiment of the present invention, the motion compensation device further comprises an integrating unit to integrate, removing from the drive signal and the ideal drive signal, the signal occurring when the motion compensation optical system receives a gravitational acceleration, wherein the position instruction value calculating unit calculates the position instruction value based on the output signal of the integrating unit.

In accordance with the second preferred embodiment of the present invention, the position instruction value calculating unit inputs the same position instruction value simultaneously to the control unit and to the ideal drive signal calculating unit.

In accordance with the second preferred embodiment of the present invention, the motion compensation device further comprises a position instruction revision unit to revise the position instruction value and to output a revised position instruction value, wherein the control unit controls driving of the motion compensation optical system by the drive unit in a range narrower than the limits of movement of the motion compensation optical system, based on the revised position instruction value.

In accordance with the second preferred embodiment of the present invention, position instruction revision unit inputs the same revised position instruction value simultaneously to the control unit and to the ideal drive signal calculating unit.

In accordance with the second preferred embodiment of the present invention, the motion compensation device further comprises a position detection unit to detect the drive position of the motion compensation optical system, and to output a position detection signal; and a drive position revision unit to revise the position instruction value based on the position detection signal, and to output a revised position instruction value, wherein the control unit controls the drive unit to drive the motion compensation optical system at or near a center of a movable range of the motion compensation optical system based on the revised position instruction value.

In accordance with the second preferred embodiment of the present invention, the drive position revision unit inputs the same revised position instruction value simultaneously to the control unit and to the ideal drive signal calculating unit.

Objects and advantages of the present invention are achieved in accordance with a third preferred embodiment of the present invention with a motion compensation device comprising a motion compensation optical system to compensate for motion causing image blur; a drive unit to drive the motion compensation optical system; a drive signal detection unit to detect a drive signal when the motion compensation optical system receives acceleration caused by motion; an ideal drive signal calculating unit to calculate an ideal drive signal when the motion compensation optical system does not receive an acceleration caused by motion; a position instruction value calculating unit to calculate a position instruction value based on the drive signal and the ideal drive signal; and a control unit to control the drive unit based on the position instruction value, wherein the ideal drive signal calculating unit calculates the ideal drive signal based on the position instruction value, which is approximated by an at least second order delay system.

In accordance with the third preferred embodiment of the invention, the ideal drive signal calculating unit represents a model of the drive unit using characteristic angular vibration number, attenuation constants, and drive performance coefficients.

In accordance with the third preferred embodiment of the invention, the motion compensation device further comprises a filter unit to remove from the drive signal, signals arising when the motion compensation optical system receives a gravitational acceleration, wherein the position instruction value calculating unit calculates the position instruction value based on the output signal of the filter unit and on the ideal drive signal.

In accordance with the third preferred embodiment of the present invention, the filter unit is a DC elimination filter which removes direct current components, including an A/D converter to A/D convert the output signal of the DC elimination filter, wherein the position instruction value calculating unit calculates the position instruction value based on the output signal of the A/D converter and on the ideal drive signal.

In accordance with the third preferred embodiment of the present invention, the motion compensation device further comprises an integrating unit to integrate, removing from the drive signal and the ideal drive signal, the signal occurring when the motion compensation optical system receives a gravitational acceleration, wherein the position instruction value calculating unit calculates the position instruction value based on the output signal of the integrating unit.

In accordance with the third preferred embodiment of the present invention, the position instruction value calculating unit inputs the same position instruction value simultaneously to the control unit and to the ideal drive signal calculating unit.

In accordance with the third preferred embodiment of the present invention, the motion compensation device further comprises a position instruction value revision unit to revise the position instruction value and to output a revised position instruction value, wherein the control unit controls the drive unit to drive the motion compensation optical system, based on the revised position instruction value, in a narrower range than the limits of possible movement of the motion compensation optical system.

In accordance with the third preferred embodiment of the present invention, the position instruction value revision unit simultaneously inputs the same revised position instruction value to the control unit and to the ideal drive signal calculating unit.

In accordance with the third preferred embodiment of the present invention, the motion compensation device further comprises a position detection unit to detect a drive position of the motion compensation optical system and to output a position detection signal; and a drive position revising unit to revise the position instruction value based on the position detection signal, and to output a revised position instruction value, wherein the control unit controls the drive unit to drive the motion compensation optical system, at or near the center of the possible range of movement of the motion compensation optical system, based on the revised position instruction value.

In accordance with the third preferred embodiment of the present invention, the drive position revising unit simultaneously inputs the same revised position instruction value to the control unit and to the ideal drive signal calculating unit.

Objects and advantages of the present invention are achieved in accordance with a fourth preferred embodiment of the present invention with a motion compensation device comprising a motion compensation optical system to compensate for motion causing image blur; a drive unit to drive the motion compensation optical system; a drive signal detection unit to detect the drive signal when the motion compensation optical system receives an acceleration caused by motion; an ideal drive signal calculating unit to calculate an ideal drive signal when the motion compensation optical system has not received an acceleration caused by motion; a position instruction value calculating unit to calculate a position instruction value based on the drive signal and the ideal drive signal; a control unit to control the drive unit based on the position instruction value; and a compensation commencement generating unit to generate a motion compensation commencement signal, wherein the ideal drive signal calculating unit calculates the ideal drive signal based on the position instruction value, and the control unit commences drive control of the drive unit based on the position instruction value, after a predetermined time has elapsed from receiving the motion compensation commencement signal.

In accordance with the fourth preferred embodiment of the present invention, the position instruction value calculating unit outputs a position instruction value of zero or a fixed value within a predetermined time from receiving the motion compensation commencement signal.

In accordance with the fourth preferred embodiment of the present invention, the motion compensation device further comprises a position detection unit to detect a drive position of the motion compensation optical system, and a decision unit to decide whether or not the deviation of the drive position and the position instruction value is smaller than a predetermined value.

In accordance with the fourth preferred embodiment of the present invention, the control unit controls driving of the drive unit based on the position instruction value when the deviation is smaller than the predetermined value and outputs a position instruction value of zero or a constant when the deviation is greater than the predetermined value.

In accordance with the fourth preferred embodiment of the present invention, the predetermined value comprises a first predetermined value which is compared with the deviation during photographic preparation, and a second predetermined value which is compared with the deviation during photography, the photographic preparation operations not having elapsed, wherein the first predetermined value is smaller than the second predetermined value.

In accordance with the fourth preferred embodiment of the present invention, the motion compensation device further comprises a gain varying unit to vary the gain of the position instruction calculating unit.

In accordance with the fourth preferred embodiment of the present invention, the gain varying unit increases the gain of the position instruction value calculating unit from zero or a constant value after receipt of a motion compensation commencement signal.

In accordance with the fourth preferred embodiment of the present invention, the gain varying unit reduces the gain of the position instruction value calculating unit to zero or a constant value when motion compensation is impossible.

In accordance with the fourth preferred embodiment of the present invention, the gain varying unit reduces the gain of the position instruction value calculating unit to zero or a constant value when the motion compensation optical system reaches a limit of possible movement.

In accordance with the fourth preferred embodiment of the present invention, the gain varying unit reduces the gain of the position instruction value calculating unit to zero or a constant value when the drive current flowing in the drive unit is greater than a predetermined electric current value.

In accordance with the fourth preferred embodiment of the present invention, the control unit stops supply of electric current to the drive unit when the current flowing in the drive unit is greater than a predetermined value, or when the voltage of the power supply providing electric current to the drive unit is smaller than a predetermined voltage value.

In accordance with the fourth preferred embodiment of the present invention, the motion compensation device further comprises a display unit to display information relating to the state of the motion compensation operation.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
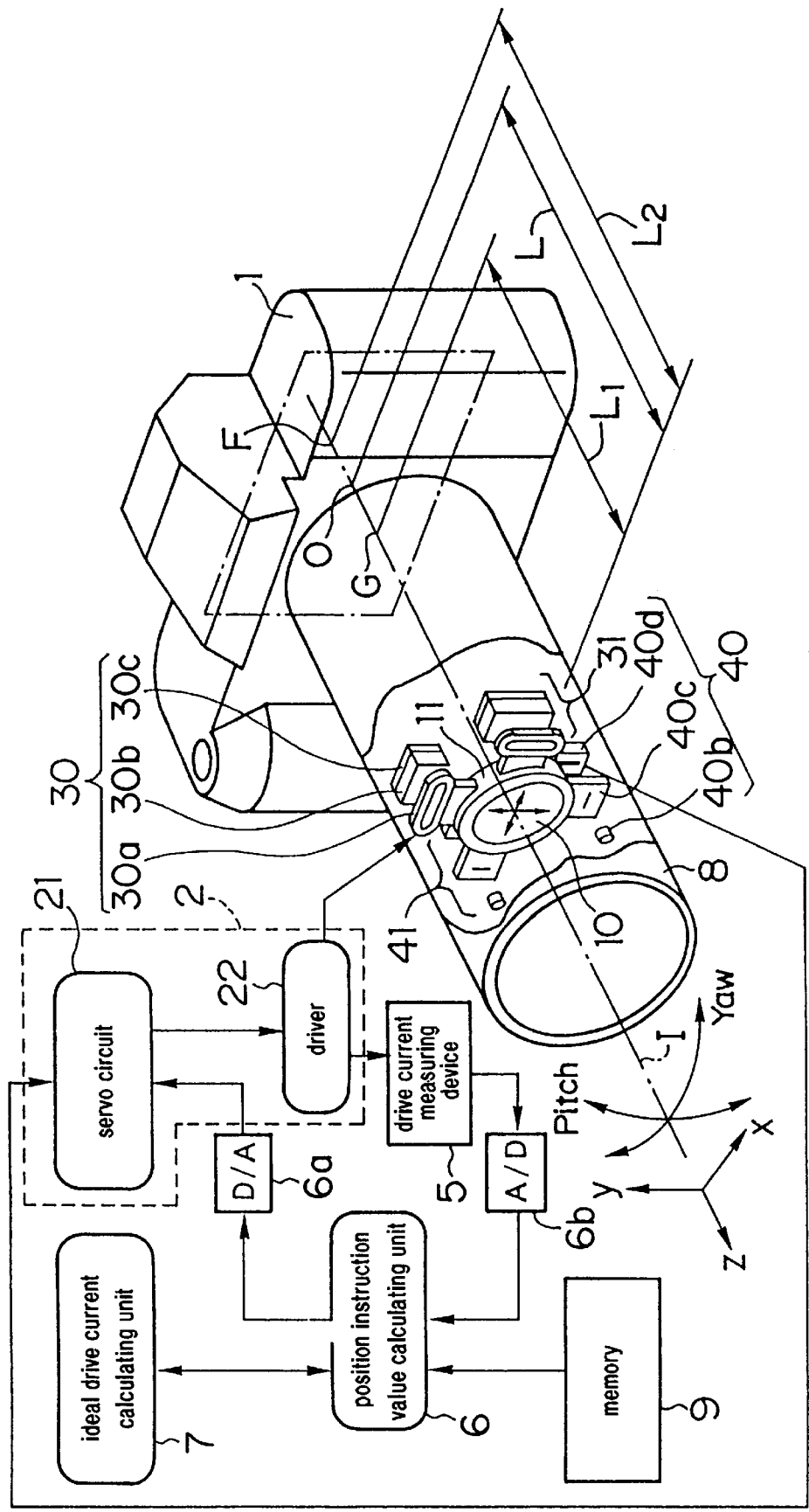
FIG. 1 is an oblique diagram of a camera system having a motion compensation device in accordance with a first and second embodiments of the present invention.

Reference will now be made in detail to the preferred embodiments of the present invention, examples of which are illustrated in the accompanying drawings, wherein like reference numerals refer to like elements throughout.

First Preferred Embodiment

A first and second preferred embodiments of the present invention will now be described in detail hereinbelow, with reference to FIGS. 1–3. The motion compensation device in accordance with the first and second embodiments of the present invention is described hereinbelow as part of a single lens reflex camera.

Figure 2:
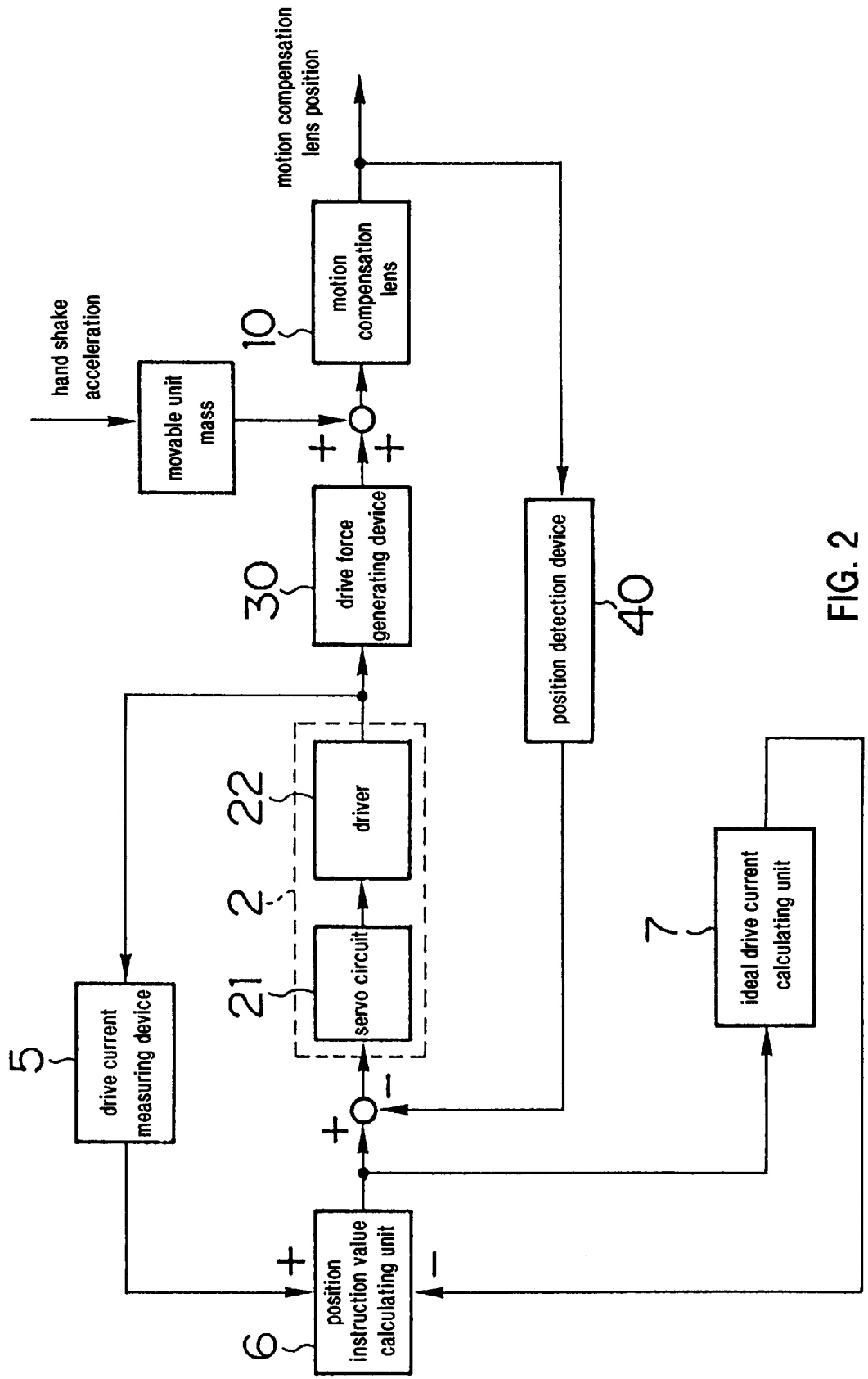
FIG. 2 is a block diagram of the motion compensation device in accordance with the first and second embodiments of the present invention.

FIG. 1 is an oblique diagram of a camera system including a motion compensation device in accordance with the first and second embodiments of the present invention. FIG. 2 is a block diagram of the motion compensation device in accordance with the first and second embodiments of the present invention.

Furthermore, hereinbelow, the case is described of detecting the acceleration component in the y axis direction, which is mentioned as an example.

As shown in FIG. 1, the motion compensation device in accordance with the first and second embodiments of the present invention is included in an interchangeable lens 8 which is mounted to a camera body 1 in a freely detachable state.

A motion compensation lens 10 comprises a portion of, or the whole of, the photographic optical system, and motion, such as hand shake, causing blur of an image formed on an image forming plane (e.g., a film plane F) is compensated for by driving the motion compensation lens in a direction perpendicular with respect to an optical axis I of the main optical system. The motion compensation lens 10 is driven in a direction which cancels the movement of the optical axis I accompanying pitching motion, yawing motion, and the like movements of the camera, and thereby compensates for hand shake, stopping the movement of the image on the imaging plane (film plane). An outer circumference of the motion compensation lens 10 is supported in the inner circumference of a lens frame 11. The lens frame 11 is cantilever supported by a resilient support member (not shown in the drawing) having a predetermined rigidity in the optical axis I direction and freely movable in the xy plane.

The lens frame 11 may be supported to slide via a slide table or steel ball (not shown in the drawing), such that a movable portion can be driven in a plane at right angles to the optical axis I. In accordance with the first embodiment of the present invention, it is preferable that the lens frame 11 can simply exhibit a movement characteristic using a model having high precision, in comparison with sliding support which supports at one end with a resilient support member.

Actuators 30, 31 are drive force generating devices which drive the motion compensation lens 10 in a plane perpendicular to the optical axis I (in the xy plane in FIG. 1). The actuator 30 drives the motion compensation lens 10 in the y direction, and the actuator 31 drives the motion compensation lens 10 in the x direction. The actuators 30, 31 are, for example, voice coil motors or the like moving coil type electromagnetic actuators. The description hereinbelow refers to only the actuator 30; however, the actuators 30, 31 have the same structure, apart from driving the motion compensation lens 10 in different directions.

The actuator 30 includes a coil 30a mounted on the lens frame 11, a magnet 30b, a yoke 30c which fixes the magnet 30b, and a yoke (not shown in the drawing) which forms a magnetic field with respect to the magnet 30b, with the coil 30a interposed. The actuator 30 forms a magnetic circuit comprising the magnet 30b, which has been magnetized and divided into two poles, the yoke 30c, and the like. When an electric current flows in the coil 30a, which lies in the magnetic lines of force, the actuator 30 generates an electromagnetic force in accordance with Fleming's left hand rule in a direction at right angles to the direction of flow of electric current and to the direction of the magnetic lines of force. When the coil 30a is in a conducting state, the actuator 30 generates a drive force in the y-axis direction in FIG. 1, and drives the motion compensation lens 10.

In accordance with preferred embodiments of the present invention, special sensors, such as angular velocity sensors, acceleration sensors or the like, are not used to detect motion.

Instead, in accordance with the preferred embodiments of the present invention, the motion compensation lens 10, the lens frame 11, one set of actuators 30, 31, and one set of position detection sensors 40, 41 are used as a motion detector. As a result, when the motion compensation lens 10 moves minutely as a result of motion causing image blur, an extra electric current flows in the coil 30a of the actuator 30.

The position detection sensors 40, 41 detect the position of the motion compensation lens 10 within the plane perpendicular to the optical axis I. The position detection sensor 40 detects the position of the motion compensation lens 10 in the y-axis direction; the position detection sensor 41 detects the position of the motion compensation lens 10 in the x-axis direction. The position detection sensors 40, 41 are disposed in positions facing the actuators 30, 31. The position detection sensors 40, 41 have like structures, and will be described hereinbelow with reference to the position detection sensor 40.

The position detection sensor 40 includes an infrared emitting diode ("IRED") 40b, a one-dimensional Position Sensing Device ("PSD") 40d, and a slit member 40c mounted on the outer circumference of the lens frame 11 between the IRED 40b and the PSD 40d, which limits the light beam from the IRED 40b. The position detection sensor 40 detects infrared light projected from the IRED 40b, which is incident on the PSD 40d through the slit member 40c. The position detection sensor 40 detects the position of the light which moves on the PSD 40d due to the movement of the slit member 40c. The position detection sensor 40 feeds back to a servo circuit 21 the position detection signal relating to the actual position of the motion compensation lens 10.

A control unit 2 controls driving of the actuator 30. The control unit 2 includes the servo circuit 21 and a driver 22.

The servo circuit 21 compares a target position signal output by a position instruction value calculating unit 6, and the position detection signal output by the PSD 40d. The servo circuit 21 performs control such that the position of the motion compensation lens 10 follows the position instruction value. In order to drive the motion compensation lens 10 based on the target position signal, the servo circuit 21 offsets the difference between the position detection signal and the target position signal. The servo circuit 21 applies gain and the like with a compensation circuit so that the position of the motion compensation lens 10 coincides with the position instructed by the position instruction value. The servo circuit 21 outputs a revised target position signal to the driver 22.

The driver 22 provides an output to the actuator 30 based on the output signal of the servo circuit 21. The driver 22 amplifies electric current, and causes drive current to flow to the actuator 30. Moreover, the driver 22 outputs a signal corresponding to the drive current to the coil 30a of the actuator 30 and to a drive current measuring device 5.

The drive current measuring device 5 measures the drive current output by the driver 22. The drive current measuring device 5 detects the drive current when the motion compensation lens 10 receives an acceleration caused by motion, for example, by detecting the difference in voltage of the ends of a resistor in the driver 22 through which drive current flows. The drive current measuring device 5 outputs to the position instruction value calculating unit 6, via an A/D converter 6b, a detection signal according to the detected drive current.

An ideal drive current calculating unit 7 calculates an ideal current value of the actuator 30 based on the target output signal output by the position instruction value calculating unit 6. The ideal drive current calculating unit 7 calculates the virtual drive current (referred to hereinbelow as "ideal drive current") in a state in which there is no acceleration caused by motion, such as hand shake, based on the target position signal, and outputs to the position instruction value calculating unit 6 an ideal output signal according to the ideal drive current. The ideal drive current calculating unit 7 has the necessary precision to model the feedback system of the control unit 2, actuator 30, motion compensation lens 10 and position detecting sensor 40. The model of the feedback system, for example, comprising op amps and the like analog elements, can calculate the ideal drive current in software on a microcomputer. In order to determine the ideal drive current, position instruction value, the model of the feedback system uses constants and transfer functions of each block, represented by the following Equation 1:

$$I=RCA/(1+PCAM) \tag{Eq 1}$$

In Equation 1, I is the current value of the ideal drive current, C is the transfer function of the control unit 2, M is the transfer function of the motion compensation lens 10, R is the position instruction value, A is a constant of the driver 22, and P is a constant of the position detection sensor 40.

The position instruction value calculating unit 6 calculates the position instruction value to drive the motion compensation lens 10 to the target position. When the actuator 30 is driving the motion compensation lens 10, the force applied by the acceleration of the motion, such as hand shake, to the motion compensation lens 10, the lens frame 11, and the like movable units, acts as an external disturbance to the motion compensation lens 10. As a result, current flows in the coil 30a of the actuator 30 as a result of the force originating from the motion causing acceleration. The position of the motion compensation lens 10 follows the position instruction value because of the application of feedback; however, the force originating as a result of the hand shake acceleration exerts an influence as an extra current value. The position instruction value calculating unit 6 determines the value which is proportional to the hand shake acceleration by comparing the value (detection signal) of the actual drive current measured by the drive current measuring device 5 with the value (ideal output signal) of the ideal drive current calculated by the ideal drive current calculating unit 7.

As shown in FIG. 1, when angular motion as a result of pitching and yawing exists, at a distance from a rotation center O of the angular motion to the motion compensation lens 10, the magnitude of motion which applied the motion angle occurs at the position of the motion compensation lens 10. Because of this, the motion angle which arises in the camera from the motion in the position of the motion compensation lens 10 can be found by using the distance from the rotation center O of the angular motion to the motion compensation lens 10.

The rotation due to motion becomes clear experimentally for a heavy camera, centered close to the center of gravity, and a lightweight camera, centered close to the film plane F. The relationship between the angle of the motion causing image blur and the acceleration in at position of the motion compensation lens 10 at a distance L from the rotation center O to the motion compensation lens 10 is be represented by the following Equation 2:

$$\theta = \int\int a \, dt^2 / L \quad \text{(Eq 2).}$$

In Equation 2, $\theta$ is the angle of motion causing image blur (rad); a is the acceleration at the position of the motion compensation lens 10 (mm/sec$^2$), and L is the distance from the center of rotation O of the motion causing blur to the motion compensation lens 10 (mm). As shown in FIG. 1, the distance L is preferably fixed between the distance $L_1$ from the center of gravity G of the camera to the motion compensation lens 10, and the distance $L_2$ from the film plane F to the motion compensation lens 10.

The position instruction value calculating unit 6 calculates the angle of motion $\theta$ of the camera from the calculated acceleration using Equation 2. Furthermore, the position instruction value calculating unit 6 calculates a drive amount (position instruction value) of the motion compensation lens 10 which is necessary to cancel the motion causing image blur in the film plane F using Equation 1 from the motion angle $\theta$. The position instruction value calculating unit 6 outputs a target position signal, according to the position instruction value, to the servo circuit 21 via the D/A converter 6a and to the ideal drive current calculating unit 7.

A memory 9 stores a value of the distance L. The distance L from the rotation center O of the motion causing image blur to the motion compensation lens 10 may change as a result of a zooming action and a focusing action when the interchangeable lens 8 is a zoom lens. The memory 9 stores in a table a constant (the value of the distance L) which changes according to the movement in the optical axis I direction of the motion compensation lens 10. The position instruction value calculating unit 6 reads out from the memory 9 the value of the distance L shown in Equation 2, and outputs a target position signal according to the position instruction value.

The operation of the motion compensation device in accordance with embodiments of the present invention will now be described below with reference to FIG. 3. More particularly, FIG. 3 is a flow chart illustrating an operational process for performing motion compensation with a motion compensation device in accordance with embodiments of the present invention.

In the description below, an example of the change of the value of the distance L with respect to the focal distance and the photographic range is used.

Beginning in step S101, it is determined whether or not the half-depression switch has been actuated ON by determining whether or not a release switch (not shown in the drawing) has been actuated. When the half-depression switch has been actuated ON, the operational process proceeds to step S102, and when the half-depression switch has not been actuated ON, the operational process ends.

Continuing in step S102, a zoom position (focal distance) is detected. The focal distance is detected, for example, with an encoder or the like disposed in the zoom ring of the lens.

Next, in step S103, an AF operation is performed to detect the photographic range in the following step S104. In step S104, the photographic range is detected. The photographic range can be calculated, for example, based on a rangefinding result detected by an AF sensor disposed in the interchangeable lens 8, or, for example, by a rotary encoder or the like device, which outputs a signal corresponding to an amount of extension of the focusing lens or an amount of rotation of the range ring.

In step S105, the value of the distance L is read out from memory. The position instruction value calculating unit 6 reads out from the memory 9 the value of the distance L which corresponds to the focal distance and the photographic range.

In step S106, the motion compensation device is actuated ON. The position instruction value calculating unit 6 calculates the motion angle $\theta$ according to Equation 2, based on the value of the distance L and the detected acceleration a. Furthermore, the position instruction value calculating unit 6 calculates the position instruction value of the motion compensation lens 10 according to Equation 1. The control unit 2 controls the actuator 30 to follow the motion compensation lens 10 based on the position instruction value, and the actuator 30 compensates for motion causing image blur by driving the motion compensation lens 10.

In step S107, it is determined whether or not the full-depression switch has been actuated ON by determining whether the release switch (not shown in the drawing) has been actuated to full depression. When the full-depression switch has been actuated ON, the operational process proceeds to step S108. When the full-depression switch has not been actuated ON, the ON actuation of the half-depression switch is cancelled, and the operational process ends the motion compensation operation.

In step S108, an exposure operation is commenced. When an exposure operation is performed in the state in which the motion compensation function has been actuated ON, a photograph can be taken with no image blur.

The motion compensation device in accordance with the first embodiment of the present invention has the following advantageous effects.

In accordance with the first embodiment of the present invention, using the actuator 30 as an acceleration sensor the drive current measuring device 5 detects the drive current arising when the motion compensation lens 10 moves as a result of motion causing image blur. The position instruction value calculating unit 6 then calculates a position instruction value based on this drive current to drive the motion compensation lens 10 to the target drive position. Accordingly, motion causing image blur can be detected by detecting the acceleration arising in the position of the motion compensation lens 10, without detecting motion using angular velocity sensors, acceleration sensors, or the like special sensors.

In accordance with the first embodiment of the present invention, the acceleration arising in the motion compensation lens 10 can be determined by subtracting the ideal drive current occurring when the motion compensation lens 10 receives no acceleration caused by motion from the drive current detected by the drive current measuring device 5.

In accordance with the first embodiment of the present invention, a motion compensation device can be manufactured inexpensively because it does not include high-cost angular velocity sensors or acceleration sensors.

In accordance with the first embodiment of the present invention, a reduction in the electric power consumption can be achieved because it is not necessary to supply power to angular velocity sensors or acceleration sensors.

In accordance with the first embodiment of the present invention, the value of the distance L is stored in the memory 9 corresponding to the amount of movement of the motion compensation lens 10 in the optical axis I direction. Because of this, the position instruction value calculating unit 6 can calculate a position instruction value according to Equation 1, according to the movement in the optical axis I direction of the motion compensation lens 10.

Second Preferred Embodiment

In accordance with a second preferred embodiment of the present invention, parallel motion causing image blur is detected by integrating the acceleration in the position of the motion compensation lens 10.

When the distance from the subject (photographic range) is known, other than the angular motions of pitching and yawing, vertical motion and horizontal motion, and the like parallel motions, have an effect in the film plane F. The parallel motion causing image blur is motion in which no angular velocity arises, and angular velocity sensors cannot detect the parallel motion.

The position instruction value calculating unit 6 determines the motion causing image blur in the film plane F by respectively adding coefficients which change according to the photographic range to the angular motion causing image blur and to the parallel motion causing image blur. The position instruction value calculating unit 6 then divides the motion in the film plane F by the compensation coefficient a of the motion compensation lens 10, and calculates the position instruction value to cancel motion in the film plane F using the following Equation 3. Furthermore, Equation 3 is a modification of Equation 2, modified by incorporating further coefficients.

$$X = \left(\beta \times \theta \times f + \gamma \times \int\int a\, dt^2\right)/\alpha \quad \text{(Eq. 3)}$$
$$= \left(\beta \times \left(\int\int a\, dt^2 / L\right) \times f + \gamma \times \int\int a\, dt^2\right)/\alpha$$
$$= (\beta/L + \gamma/f) \times \left(\int\int a\, dt^2\right) \times f/\alpha$$
$$= (1/L') \times \left(\int\int a\, dt^2\right) \times f/\alpha$$

where $L' = 1/(\beta/L + \gamma/f)$

In Equation (3), X is the position instruction value (mm); $\theta$ is the angle of motion causing image blur (rad); f is the focal distance (mm); a is the acceleration (mm/sec$^2$) in the position of the motion compensation lens 10; $\beta$ is an angular motion contribution coefficient; $\gamma$ is a parallel motion contribution coefficient; $\alpha$ is a compensation coefficient of the motion compensation lens 10; L is the distance from the center of rotation O to the motion compensation lens 10; L' is the distance from the center of rotation O of motion, which included each coefficient, to the motion compensation lens 10.

The memory 9 stores in a table the constants (values of the distance L') which correspond to the photographic range. The position instruction value calculating unit 6 can vary the value of the distance L by reading out the value of the distance L'.

The motion compensation device in accordance with the second embodiment of the present invention has the effect stated below in addition to the effects of the first embodiment of the present invention.

In accordance with the second preferred embodiment of the present invention, the distance L' brings together two coefficients which change according to the photographic range. Because of this, in addition to the effects of the motion compensation device in accordance with the first embodiment of the invention, by changing L' according to the photographic range, the motion compensation device is able to compensate motion causing image blur taking into account parallel motion by a calculation similar to that which takes angular motion into account.

Third Preferred Embodiment

Figure 4:
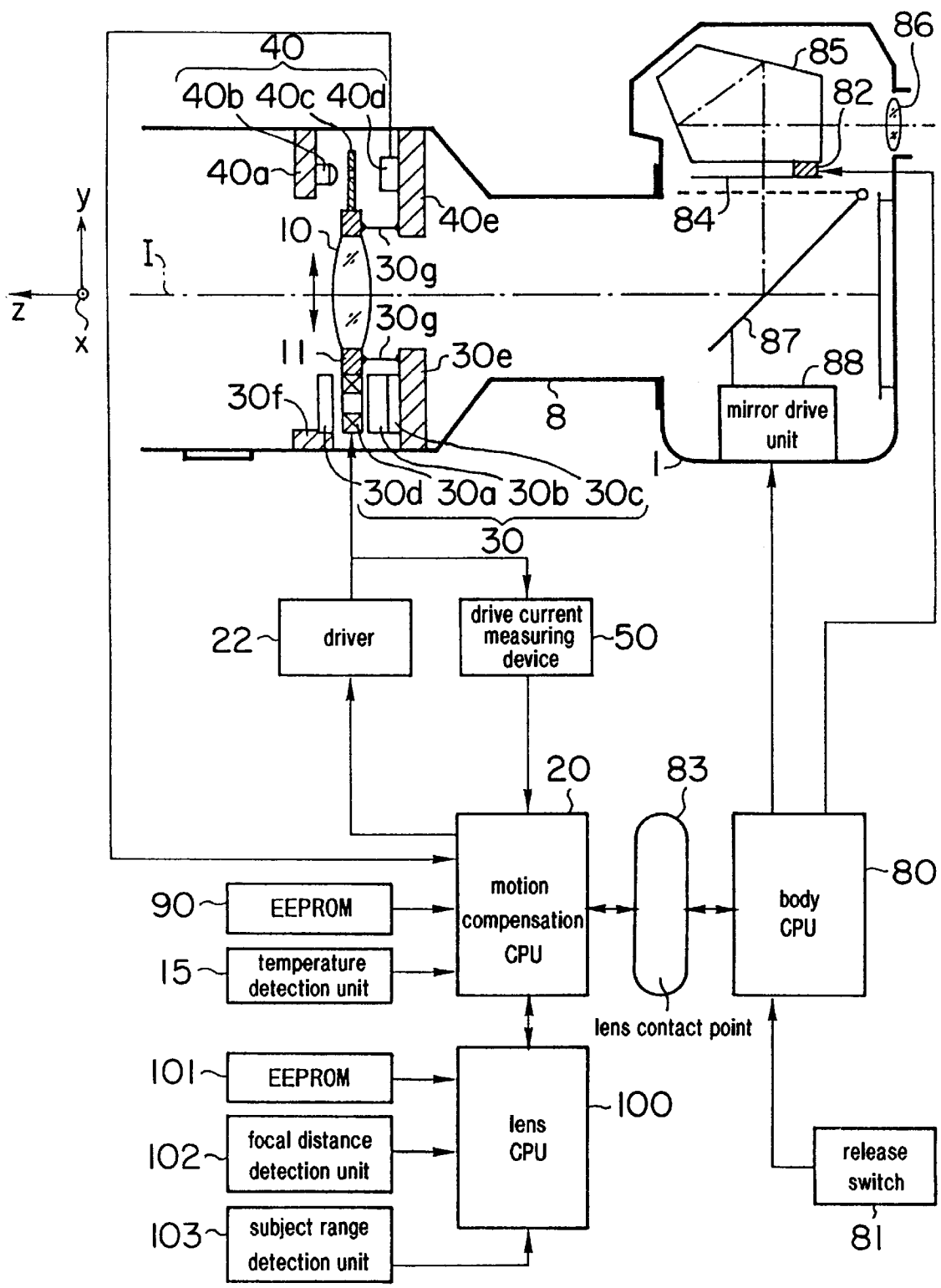
FIG. 4 is a block diagram of a camera system having a motion compensation device in accordance with a third embodiment of the present invention.

FIG. 4 is a block diagram of a camera system having a motion compensation device in accordance with a third preferred embodiment of the present invention. Elements which are the same as or similar to those shown in FIGS. 1 and 2 are referred to by the same reference symbols and numerals and a detailed description of the like elements will not be repeated here.

Moreover, the description which follows uses the detection of acceleration in the y-axis direction as an example.

As shown in FIG. 4, the interchangeable lens 8 includes an actuator 30, driver 22, position detection sensor 40, drive current measuring device 50, motion compensation lens 10, motion compensation CPU 20, EEPROM 90, temperature detection unit 15, lens CPU 100, EEPROM 101, focal distance detection unit 102, subject range detection unit 103, and the like.

The actuator 30 converts the drive current output by the driver 2 into drive force to drive the motion compensation lens 10, and drives the motion compensation lens 10 in the y direction. The actuator 30 includes a yoke 30*d* mounted on a mounting member 30*f*, a magnet 30*b* and a yoke 30*c* which fixes the magnet 30*b* mounted to a mounting member 30*e*, a coil 30*a* mounted to the lens frame 11 side surface and a wire 30*g* which supports, freely movable, the lens frame 11 with respect to the mounting member 30*e*. The actuator 30 generates a drive force in a direction approximately at right angles to the optical axis I when the driver 22 causes a drive current to flow in the coil 30*a*, and drives the motion compensation lens 10 to follow the target position. Furthermore, the actuator which drives the motion compensation lens 10 in the x direction has the same structure as the actuator 30, and is omitted from the drawing.

In accordance with the third preferred embodiment of the present invention, the actuator 30, motion compensation lens 10 and lens frame 11 are conjointly used as sensors which detect the accelerations corresponding to pitching and yawing motions.

Because of this, the good precision model of the actuator and the like, it is preferable to design a structure of the actuator 30 and the like with which the motion compensation device is equipped which is easily modeled mathematically. In a structure which supports the lens frame 11 to rotate or slide, via a slide member or steel ball or the like, as a model of movement characteristics of displacement with respect to force, it is preferable not to introduce elements of poor precision and with non-linearities, such as insensitive zones due to solid friction. Alternatively, in a structure in which resilient support members support movable portions, the movement characteristics can be represented by a simple, good precision, linear model.

The four wires 30*g* of the actuator 30 extend parallel to the optical axis I, and have one end fixed to the mounting member 30*e* and the other end fixed to the lens frame 11. The actuator 30 moves the motion compensation lens 10 in a plane (in the xy plane) at right angles to the wires 30*g*.

The position detection sensor 40 includes an IRED 40*b* mounted in a mounting member 40*a*, a one-dimensional PSD 40*d* mounted in a mounting member 40*e*, and a slit member 40*c*. The position detection sensor 40 feeds back to the motion compensation CPU 20 a position detection signal according to the position of the motion compensation lens 10.

Furthermore, the position detection sensor 40 which detects the position of the motion compensation lens 10 in the y-axis direction has the same structure as the position detection sensor 40, and is omitted from the drawing.

The driver 22 provides electrical power to the actuator 30 based on the position instruction value output by the motion compensation CPU 20. The driver 22 is, for example, a PWM driver having small power consumption.

Figure 5:
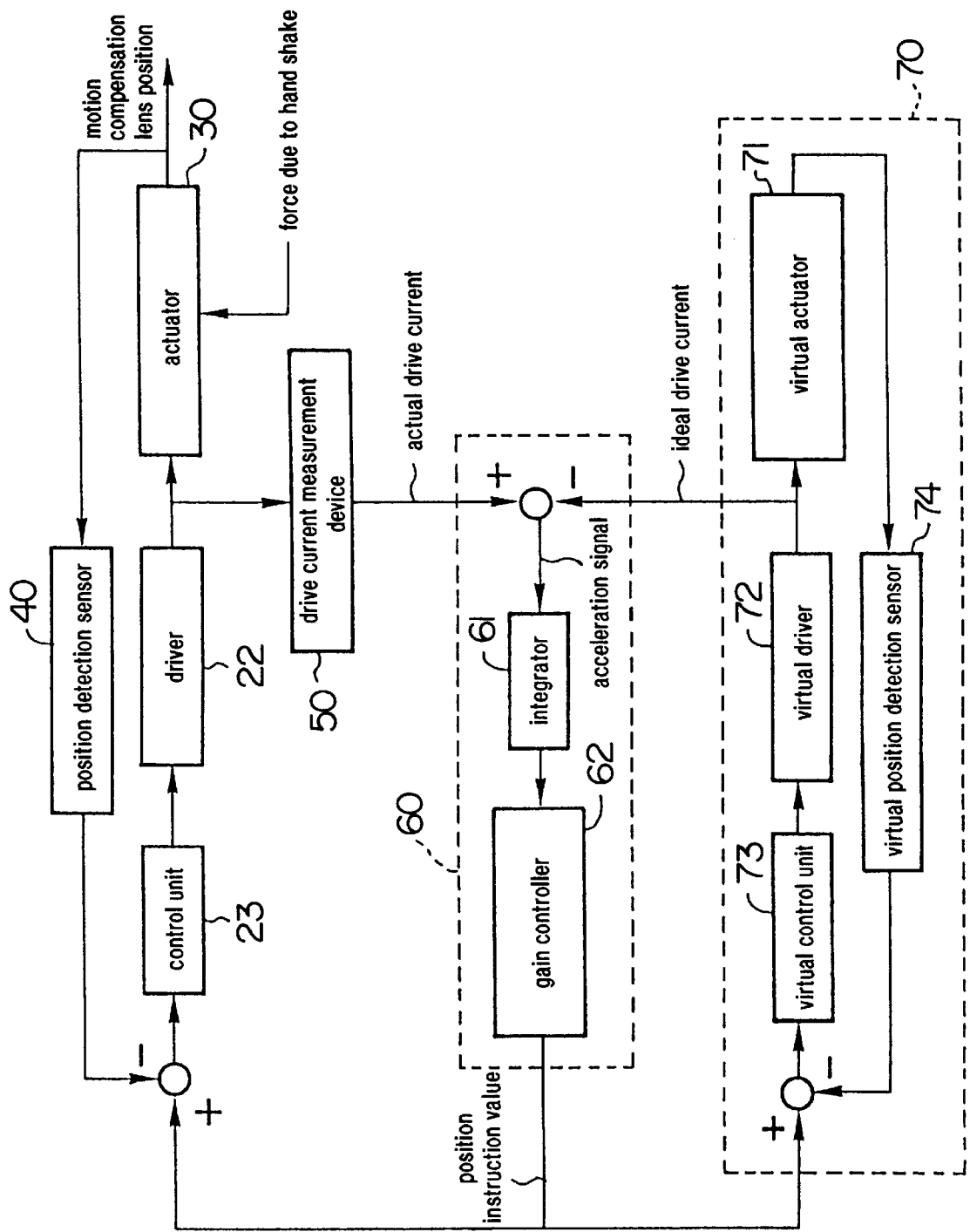
FIG. 5 is a block diagram of the motion compensation device in accordance with the third embodiment of the present invention.

The drive current measuring device 50 samples and A/D converts the drive current provided by driver 22 to continuously acquire the drive current as a digital signal, and outputs a detected drive current value to the position instruction value calculating unit 60 (FIG. 5).

The motion compensation CPU 20 is a central processing unit which calculates the position instruction value to drive the motion compensation lens 10 to the target position, based on the drive current measured by the drive current measuring device 50 and on the position detection signal output by the position detection sensor 40. The motion compensation CPU 20 determines whether or not the deviation of the actual position and the position instruction value of the motion compensation lens 10 is smaller than a predetermined value.

The motion compensation CPU 20 is connected to a body CPU 80 via a lens contact point 83 disposed between the interchangeable lens 8 and the camera body 1, and communicates with the body CPU 80. The driver 22, position detection sensor 40, drive current measuring device 50, EEPROM 90, temperature detection unit 15, and lens CPU 100 are connected to the motion compensation CPU 20.

The lens CPU 100 is connected to the EEPROM 101, the focal distance detection unit 102, and the subject range detection unit 103. Lens data is written in the EEPROM 101 which is characteristic information relating to the interchangeable lens 8. The focal distance detection unit 102 detects the focal distance, and outputs focal distance information relating to the focal distance. The subject range detection unit 103 detects the subject range, and outputs subject range information relating to the subject range. The lens CPU 100 is a central processing unit which communicates various data to the motion compensation CPU 20. In particular, the lens CPU 100 communicates to the motion compensation CPU 20 lens data read out from the EEPROM 101, focal distance information output by the focal distance detection unit 102, subject range information output by the subject range detection unit 103, and the like.

The camera body 1 includes the body CPU 80, a release switch 81, a display device 82, a lens contact point 83, a viewfinder screen 84, a quick release mirror 87 which distributes to a viewfinder optical system 85 and an eyepiece lens 86 a light beam passing through the photographic optical system, and a mirror drive unit 88 which drives the quick release mirror 87.

The release switch 81, the display device 82 and the mirror drive unit 88 are connected to the body CPU 80. The body CPU 80 is a central processing unit which, for example, emits a motion compensation commencement signal based on the ON actuation of the release switch 81, instructs the drive commencement of the motion compensation lens 10 by the motion compensation CPU 20, instructs a predetermined display by the display device 82, and controls driving of the mirror drive unit 88.

The release switch 81 is a switch which is actuated in response to half-depression of a release button (not shown in the drawing) to initiate a series of photographic preparatory operations and causes the commencement of the drive of the mirror drive unit 88, and the like photographic operations in response to the full-depression actuation of the release button.

The display unit 82 displays information relating to the motion compensation operation. For example, when motion compensation operations are performed normally, display unit 82 displays to this effect on the viewfinder screen 84, which may be an LED or liquid crystal display device or the like.

FIG. 5 is a block diagram of a motion compensation device in accordance with the third preferred embodiment of the present invention. FIG. S shows the change of position of the motion compensation lens 10 with respect to a force applied by the actuator 30 to the motion compensation lens 10.

The motion compensation device in accordance with the third preferred embodiment of the present invention detects motion without the use of angular velocity sensors, acceleration sensors, and the like special sensors. More particularly, the motion compensation device in accordance with the third embodiment of the invention conjointly uses the mass of the motion compensation lens 10, the lens frame 11 and the actuator 30, which drives these elements, as an acceleration sensor. The motion compensation device drives the motion compensation lens 10 with the actuator 30, calculates the motion of the camera causing image blur based on the calculated acceleration, and drives the motion compensation lens 10 with the actuator 30 to compensate for motion of the image in the image plane. An acceleration sensor which uses such an actuator 30 can be said to be an extension of a servo-type accelerometer.

Servo-type accelerometers comprise a movable unit having some mass, supported to be drivable in an axial direction of acceleration to be measured, an electromagnetic actuator to drive the movable unit, a sensor to detect the position of the movable unit, and the like. The position detection sensor normally monitors the position of the movable unit, and forms a closed loop with the electromagnetic actuator. The electromagnetic actuator then drives the movable unit such that the position of the movable unit is fixed at one point. When an acceleration is imparted to the servo type accelerometer, the movable unit moves minutely as a result of inertia, and current flows in the electromagnetic actuator to cancel the movement.

Accordingly, a signal proportional to the acceleration applied to the servo accelerometer can be obtained by measuring the current flowing in the electromagnetic actuator.

When the motion compensation lens 10 and the lens frame 11 are considered to correspond to the movable unit having mass, the actuator 30 has a constitution which very much resembles a servo-type accelerometer. However, the servo-type accelerometer drive controls in a fixed position of the movable unit, and, in contrast, the actuator 30 differs in that it drive controls following the movable unit, in a target position which changes with time.

As shown in FIG. 5, the control unit 23 corresponds to a servo circuit which outputs a drive signal to the driver 22 to follow in coincidence with the position of the motion compensation lens 10 in a position according to the position instruction value. The control unit 23 compares the position instruction value output by the position instruction value calculating unit 60 and the position detection signal output by the PSD 40$d$, applies a gain, and outputs a drive current to the driver 22, performing suitable phase compensation as necessary.

The ideal drive current calculating unit 70 calculates the ideal drive current of the actuator 30 when the motion compensation lens 10 does not receive an acceleration caused by motion. The ideal drive current calculating unit 70 calculates the virtual drive current (ideal drive current) in a state in which there is no acceleration caused by motion, such as hand shake, based on the position instruction value output by the position instruction value calculating unit 60, and outputs the ideal drive current to the position instruction value calculating unit 60.

The current flowing in the actuator 30 comprises a combination of a current component corresponding to the acceleration imparted to the servo accelerometer, and a current component to drive the motion compensation lens 10 to the target position. In order to extract the current component according to the acceleration, the ideal drive current calculating unit 70 is internally equipped with a model of the actual actuator 30, the driver 22, the control unit 23 and the position detection sensor 40 (termed hereinbelow the "actual system"), and is a model of the feedback system (termed hereinbelow the "dummy system") which behaves in a similar manner. The ideal drive current calculating unit 70 simulates the ideal drive current, and calculates the change according to the position instruction value which was input.

The ideal drive current calculating unit 70 simulates a value of current flowing in coil 30a when there is no hand shake acceleration, compares the actual current flowing in the coil 30a and the simulated current, and calculates their difference. The ideal drive current calculating unit 70 may include a micro-computer, and the model included in the ideal drive current calculating unit 70 is, for example, programmed in software.

Figure 6:
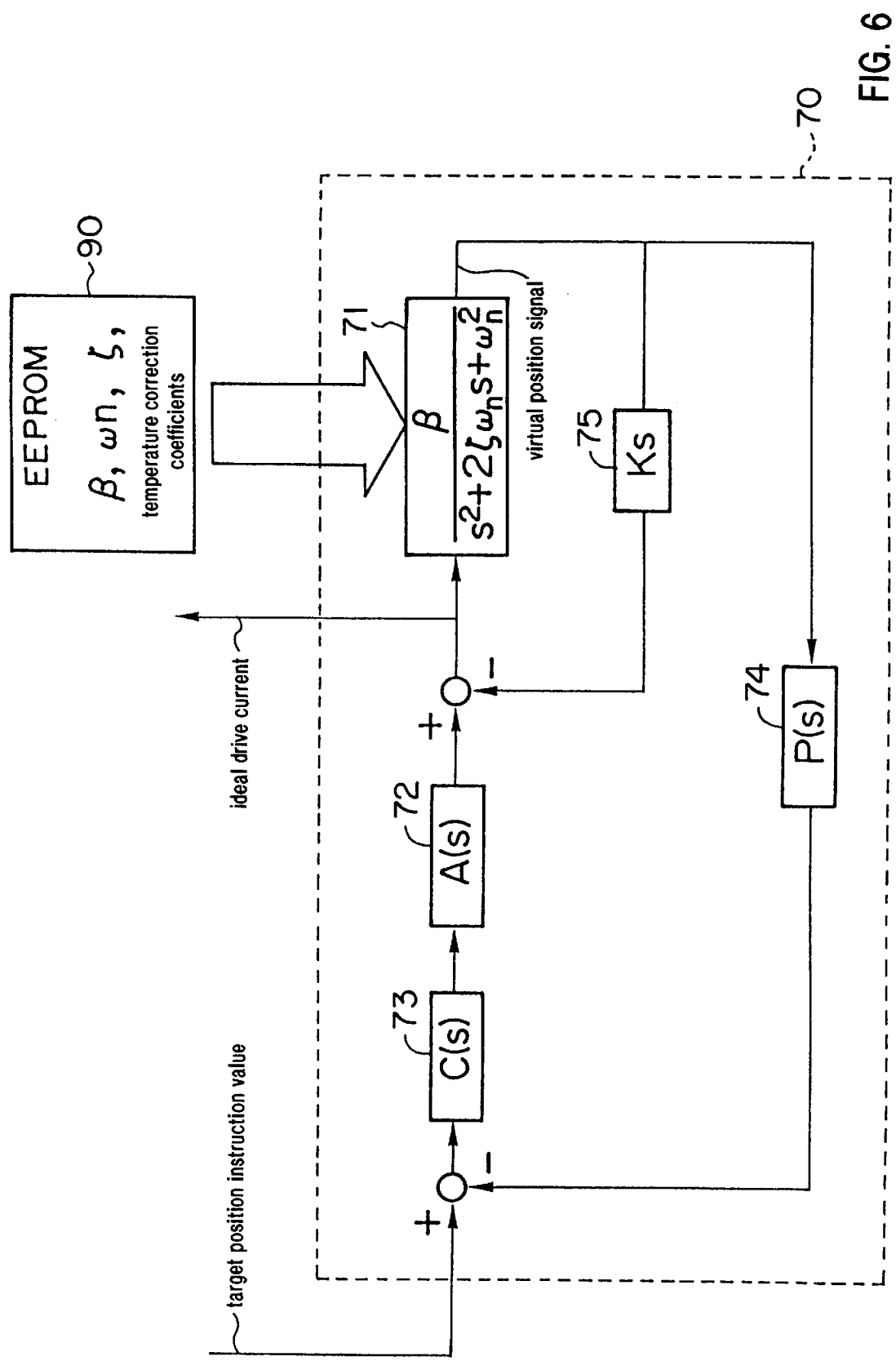
FIG. 6 is a block diagram of an ideal drive current calculating unit in the motion compensation device in accordance with the third embodiment of the present invention.

FIG. 6 is a block diagram of the ideal drive current calculating unit 70 in a motion compensation device in accordance with the third embodiment of the present invention.

The ideal drive current calculating unit 70 comprises a virtual actuator 71, a virtual driver 72, a virtual control unit 73, a virtual position detection sensor 74, and a reverse voltage model 75.

The virtual control unit 73 is a model of a control unit which behaves similarly to the actual control unit 23. As a model of the actual control unit 23, the virtual control unit 73 performs the same calculations in software as the actual control unit 23.

The virtual driver 72 is a model of a driver which behaves similarly to the actual driver 22. Because of the inductance of a coil the current is not pulsed, and because the current flows rather smoothly, the virtual driver 72 can be considered to be similar to a voltage driver. In this case, by introducing the coil 30a of the actuator 30 into consideration in the reverse voltage model 75, a model can be constructed which determines the current value flowing in the coil 30a.

The virtual position detection sensor 74 is a model of a position detection sensor which behaves similarly to the actual position detection sensor 40. The virtual position detection sensor 74 is represented by a constant which represents the sensitivity of the position detection sensor 40.

The virtual actuator 71 is a model of an actuator and the like which behaves similarly to the motion compensation lens 10 and the lens frame 11. The virtual actuator 71 is necessary to construct a model which substitutes a numerical expression for the mechanical characteristics.

When the motion compensation lens 10 is supported by a resilient support member, the relation between the displacement of the motion compensation lens 10 and the drive force is approximately described in differential Equation (4) as follows.

$$m\, dX^2/dt^2 + c\, dX/dt + kX = F \qquad \text{(Eq. 4)}$$

Via Laplace transform, the transfer function of the displacement of the motion compensation lens 10 with respect to the drive force follows from Equation (4), as shown by the following Equation (5).

$$(X/F) = 1/(ms^2 + cs + k) \qquad \text{(Eq. 5)}$$

In Equation (5), s is a differential operator which represents differentiation with respect to time. A model described as the form of transfer function like Equation (5) which includes squared s, is referred to as second order delay system.

In Equations (4) and (5), X is the movement (displacement) of the motion compensation lens 10, F is the actuator drive force, m is the mass of the moving unit, c is a coefficient of viscosity, and k is a spring constant.

Moreover, the virtual actuator 71 can be described as the transfer function of the displacement of the motion compensation lens 10 with respect to the drive current as shown in the following Equation 5 using the mass m of the moving unit, the coefficient of viscosity c, and the spring constant k to represent the characteristic angular frequency, damping constant, and actuator drive performance constant.

$$(X/I) = \beta/(s^2 + 2\zeta\omega_n s + \omega_n^2) \qquad \text{(Eq. 6)}$$

In Equation (6), s is a differential operator which stands for differentiation with respect to time, X is the movement (displacement) of the motion compensation lens 10, I is the actuator drive current, $\beta$ is the actuator drive performance constant, s is a differentiate operator which stands for differentiation with respect to time, $\omega_n$ is the characteristic angular frequency, and $\zeta$ is a damping constant.

Among the mass m of the moving unit, the coefficient of viscosity c, and the spring constant k, the value of the coefficient of viscosity c is particularly difficult to determine experimentally. Because of the difficulty of experimentally determining the coefficient of viscosity c, the actuator drive performance constant B, the characteristic frequency $\omega_n$, the damping coefficient $\zeta$ and the like values are written in EEPROM 90 and stored when adjusted or when forwarded. The ideal drive current calculating unit 70 uses these values from the EEPROM 90 in the predetermined calculation, reading them out at the time of motion compensation.

The actuator drive performance constant $\beta$, the characteristic frequency $\omega_n$, and the damping constant $\zeta$ generally have temperature coefficients. For example, the actuator drive performance constant $\beta$ varies according to the characteristics of the magnet 40b used in the magnetic circuit, or according to the characteristics of the coil 40a. Because the various characteristics of the magnet 40b or the electrical resistance of the coil 40a, and the like, have comparatively large temperature characteristics, there is a possibility that the actuator drive performance constant $\beta$, the characteristic frequency $\omega_n$, and the damping constant $\zeta$ change over the course of time or due to temperature or the like. The EEPROM 90 stores the respective constants necessary for the temperature compensation coefficients to compensate for temperature characteristics.

Accordingly, when the ideal drive current calculating unit 70 calculates the ideal drive current, the ideal drive current calculating unit compensates for temperature characteristics based on the temperature information detected by the temperature detection unit 15, and on the temperature compensation coefficients read out from the EEPROM 90.

Furthermore, when the virtual actuator 71 is modeled using analog circuits, for example, semi-solid resistors and the like, values corresponding to the constants stored by the EEPROM 90 can be adjusted.

In the above-described manner, the entire model can be constructed by joining together the virtual actuator 71, the virtual driver 72, the virtual control unit 73, the virtual position detection sensor 74, and the reverse voltage model 75, and performing feedback. When the ideal drive current calculating unit 70 is a software model, the software model simulates each variable with respect to the input position instruction value by numerical calculations, and outputs the drive current as a representative variable. Further, performing simulation using the respective model, constitutes a complete method connecting the whole together, and non-linear elements and the like can be introduced in the course of this representation. Moreover, the model can easily be revised in accordance with the temperature characteristics and the like, by changing various constants and the like.

Figure 7:
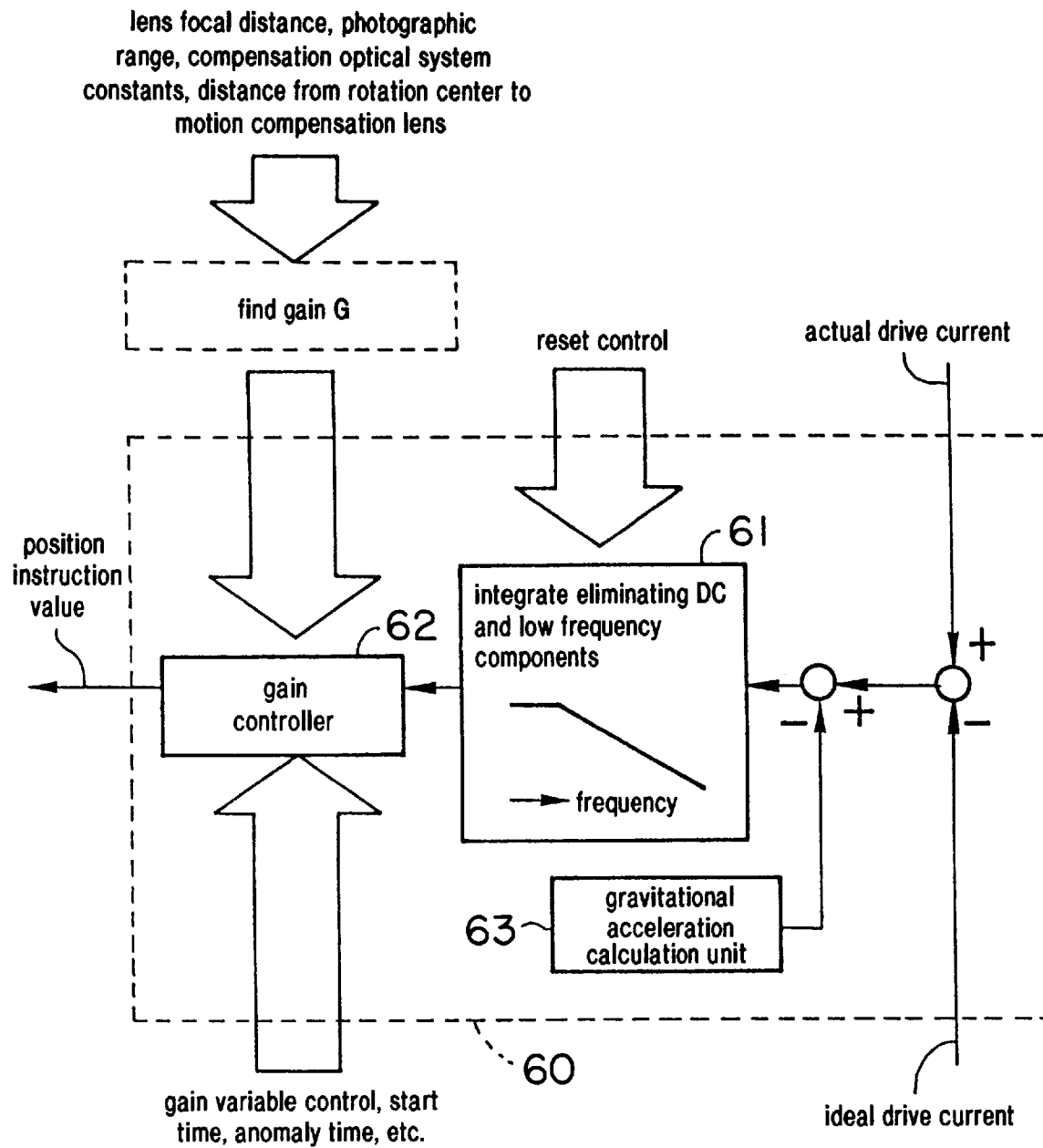
FIG. 7 is a block diagram of a position instruction value calculating unit in the motion compensation device in accordance with the third embodiment of the present invention.

FIG. 7 is a block diagram of the position instruction value calculating unit 60 in the motion compensation device in accordance with the third embodiment of the present invention. The position instruction value calculating unit 60 calculates the position instruction value in order to drive the motion compensation lens 10 to the target position. The position instruction value calculation unit 60 includes an integrator 61, a gain controller 62, and a gravitational acceleration calculating unit 63. The position instruction value calculating unit 60 compares the drive current value detected by the drive current measuring device 50 and the ideal drive current value calculated by the ideal drive current calculating unit 70, and calculates an acceleration signal according to the motion, such as hand shake, causing acceleration. The position instruction value calculating unit 60 determines the displacement by performing with the integrator 61 a double integration of the acceleration signal corresponding to the acceleration in two directions at right angles to the optical axis, and by applying gain with the gain controller 62, to calculate the motion angle θ of pitching and yawing. In order to cancel the motion causing image blur in the optical image plane, the position instruction value calculating unit 60 calculates the position instruction value relating to the target position of the motion compensation lens 10 using the following Equation (7) based on the motion angle θ of pitching and yawing.

$$X \approx f \times \theta / \alpha \qquad \text{(Eq. 7)}$$

In Equation (7), X is the movement (mm) of the motion compensation lens 10; f is the focal distance (mm); θ is the motion angle (rad) of the camera; and α is the compensation coefficient of the motion compensation lens 10. The compensation coefficient α represents the ratio of the amount of movement of the image in the image plane with respect to the amount of movement of the motion compensation lens 10. The compensation coefficient a changes according to the design of the optical system.

Furthermore, the position instruction value calculating unit 60 outputs the same position instruction value simultaneously to the control unit 23 and to the ideal drive current calculating unit 70. When the actuator 30 drives the motion compensation lens 10, the force, such as hand shake, which applies acceleration to the mass of the moving unit of the motion compensation lens 10, the lens frame 11, and the like, acts as an external disturbance to the motion compensation lens 10. Accordingly, as a result of the force which originates in acceleration caused by motion, such as hand shake, current flows in the coil 30a of the actuator 30.

The position of the motion compensation lens 10 follows the position instruction value because feedback is applied, but the force which originates as a result of the acceleration caused by hand shake exerts an influence as an extra drive current value. The position instruction value calculating unit 60 calculates a value (acceleration signal) which is proportional to the hand shake acceleration by taking the difference between the ideal drive current value, which was found for the ideal state of no external disturbance (e.g., no hand shake acceleration), and the actual drive current value. The magnitude of the acceleration signal, the magnitude of the hand shake acceleration and the actuator drive performance coefficient β are related as shown by the following Equation 8:

$$\Delta I = a/\beta \qquad \text{(Eq. 8)}$$

In Equation (8), ΔI is the difference (acceleration signal) of the actual drive current and the ideal drive current; α is the acceleration caused by motion such as hand shake; and β is the actuator drive performance coefficient, and is the possible acceleration arising in the moving unit per unit current.

The gravitational acceleration calculating unit 63 calculates an estimation of the gravitational acceleration. In order to include in the acceleration signal ΔI the signal caused by gravitational acceleration, in addition to the signal caused by hand shake acceleration, it is necessary to find the acceleration component caused by hand shake, subtracting the signal component caused by gravitational acceleration from the acceleration signal ΔI. In the state in which the servo is affected by gravity, a deviation exists, although slight, between the target position instruction value of the motion compensation lens 10 and the actual position instruction value.

The gravitational acceleration calculating unit 63 considers the low frequency components and DC component in the acceleration signal as signal components caused by gravitational acceleration, and removes the signal components caused by gravitational acceleration with a DC elimination filter which removes the low frequency components and DC component.

The integrator 61 calculates a value corresponding to the displacement caused by hand shake in the position of the motion compensation lens 10 by performing a double integration of the acceleration signal. For this purpose, the integrator 61 does not integrate the DC component, and integrates only the signals in the hand shake frequency region.

The integrator 61 may comprise, for example, a first order or second order low pass filter. In this case, if a first order low pass filter performs a first integration, and a second order low pass filter performs a second integration, it is possible to integrate the hand shake frequency region by using frequency regions higher than the cutoff frequency of the low pass filters. For example, the hand shake frequency region can be integrated if a first order low pass filter with a gain decrease region of 20 dB/dec, and a second order low pass filter with a gain decrease region of 40 dB/dec are used.

Moreover, the cutoff frequency of the low pass filters is set to a frequency lower than the hand shake frequency which is the subject of the compensation.

Furthermore, if a second order low pass filter is used, the frequency characteristics of the motion compensation system can be partially adjusted by adjusting the parameter of the attenuation factor.

The gain controller 62 calculates a position instruction value, applying gain to the double integrated signal of the integrator 61. The gain controller 62 can vary the magnitude of the gain directly after motion compensation commencement or when there is an anomaly of the motion compensation operation. Moreover, the gain controller 62 can vary the magnitude of the gain according to changes of the lens focal distance, the photographic range, or the like.

The displacement caused by hand shake can be determined, for example, by the following Equation (9) when the subject is not at a close range.

$$X = y f / l \alpha \qquad \text{(Eq. 9)}$$

In Equation (9), X is the necessary drive amount of the motion compensation lens 10; y is the displacement caused by hand shake or similar motion; f is the lens focal distance;

l is the distance from the rotation center of hand shake to the motion compensation lens 10; and cc is a compensation coefficient.

The magnitude of the gain is determined from the distance I from the rotation center of hand shake to the motion compensation lens 10, the lens focal distance f, the compensation coefficient α, the photographic range, and the like. As shown by the following Equation (10), the gain can be represented by the necessary drive amount of the motion compensation lens 10 with respect to the displacement y caused by hand shake.

$$G = f/l\alpha \qquad \text{(Eq. 10)}.$$

In Equation (10), the gain G changes with the values of the distance I from the rotation center of hand shake to the motion compensation lens 10, the lens focal distance f, the compensation coefficient α. The gain G changes also with changes of the photographic range, and the like. Because the gain G changes according to the distance l, the lens focal distance f, the compensation coefficient α, and the like, by reading out these values during motion compensation, a suitable value of the magnitude of the gain G with respect to these values is calculated. The suitable values of gain corresponding to the parameters 1, f and α are stored in a table, and values of the gain may be read out from the table according to the parameters during motion compensation.

The operation of a camera system having a motion compensation device in accordance with the third embodiment of the present invention will now be described below with reference to FIG. 8.

Figure 8:
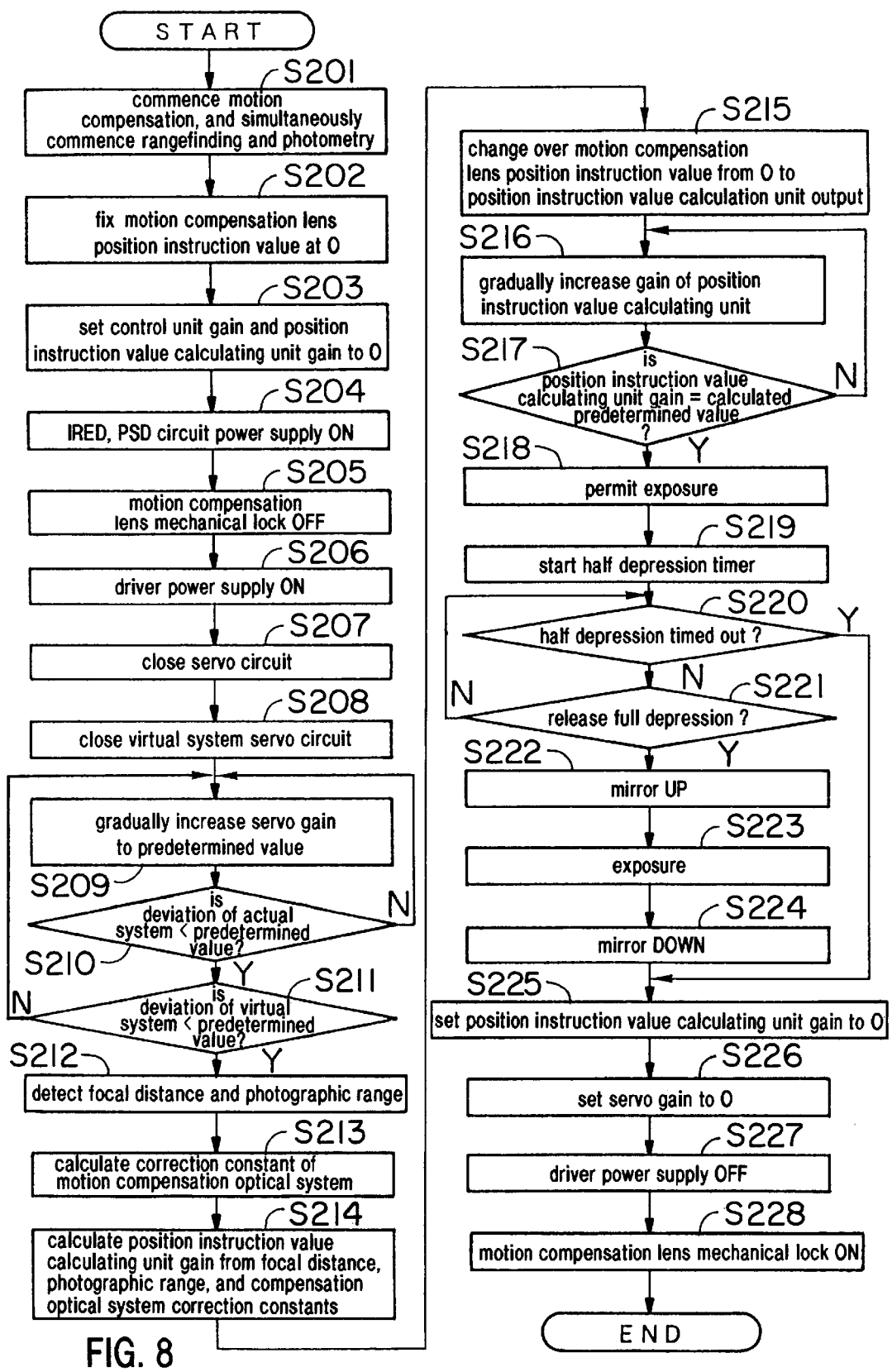
FIG. 8 is a flow chart of an operational process for performing motion compensation in a camera having the motion compensation device in accordance with the third embodiment of the present invention.

FIG. 8 is a flow chart illustrating an operational process for performing motion compensation with a camera system including the motion compensation device in accordance with the third embodiment of the present invention. The camera body commences the motion compensation operation in response to the half-depression actuation of the release switch 81 (photographic preparation operations) or by the full-depression actuation simultaneously with the half-depression actuation (photographic operation not passing through photographic preparation operations).

Beginning in step S201, rangefinding and photometry are commenced simultaneously with motion compensation operation commencement. The body CPU 80 outputs a motion compensation commencement signal to the motion compensation CPU 20 via the lens side contact point 83 based on the half-depression actuation of the release switch 81 or by the full-depression actuation simultaneously with the half-depression actuation. Simultaneously, the subject range detection unit 103 measures the range to the subject, and a photometric circuit (not shown in the drawing) measures the luminosity of the subject.

Next, in step S202, the position instruction value of the motion compensation lens 10 is fixed at zero, and in step S203, the gain of the control unit 23 and the gain of the position instruction value calculating unit 60 are set to zero. The motion compensation CPU 20 sets the gain of the control unit 23 to zero, and instructs the position instruction value calculating unit 60 to set the gain to zero by the gain controller 62. The position instruction value calculating unit 60 controls the gain controller 62, and fixes the position instruction value at zero.

The motion compensation device in accordance with the third embodiment of the present invention uses the actuator 30, the motion compensation lens 10 and the lens frame 11 as an acceleration sensor. Because of this, after feedback comprising the driver 22, the control unit 23, the actuator 30 and the position detection sensor 40, it is necessary for the position of the motion compensation lens 10 to sufficiently follow the target position. In a state in which the position of the motion compensation lens 10 does not follow the target position, the hand shake acceleration cannot be detected even by detecting the drive current of the actuator 30. Directly after the introduction of a power supply, a period of time passes until the motion compensation lens 10 follows the target position. As a result, the target position cannot be calculated during this time because acceleration cannot be detected, and there is a possibility that the motion compensation control becomes impossible. Similarly, in the feedback system of the ideal drive current calculating unit 70, it is necessary for the position variable to follow the target variable.

The motion compensation device in accordance with the third embodiment of the present invention does not immediately commence a motion compensation operation when the motion compensation CPU 20 receives a motion compensation commencement signal, but fixes the target position of the motion compensation lens 10 at zero.

As a result, after feedback of the actual system and the virtual system, the motion compensation CPU 20 controls the target position to zero during a predetermined time period from receipt of the motion compensation commencement signal. After the predetermined time period has elapsed, the motion compensation CPU 20 commences motion compensation because the detection of acceleration becomes possible.

Continuing in step S204, the power supply to the circuits of the MRED 40b and the PSD 40d is set ON. The motion compensation CPU 20 instructs a power supply circuit (not shown in the drawing) to provide a power supply to the process circuits of the IRED 40b and the PSD 40d.

In step S205, the mechanical lock of the motion compensation lens 10 is actuated OFF. The motion compensation device includes a fixing member (not shown in the drawing) which fixes the motion compensation lens 10 in a predetermined position when the motion compensation operation is stopped. The motion compensation CPU 20 instructs the fixing member to release the fixing of the motion compensation lens 10.

In step S206, the power supply to the driver 22 is set ON. The motion compensation CPU 20 instructs a power supply circuit (not shown in the drawing) to provide a power supply to the driver 22.

In step S207, the servo circuit 21 is closed. The motion compensation CPU 20 also closes the servo circuit of the virtual control unit 73 (step S208) simultaneously with the control of the actual servo circuit and commences control of the virtual actuator 71.

In step S209, the servo gain is gradually increased from the predetermined value. The motion compensation CPU 20 gradually increases the servo gain from the predetermined value by variably controlling the gain of the control unit 23, and gradually raises the servo gain from the predetermined value by variably controlling the gain of the virtual control unit 73.

In step S210, the deviation of the actual system is compared with a predetermined value to determine whether the deviation of the actual system is smaller than the predetermined value. It is necessary for the position of the motion compensation lens 10 to sufficiently follow the target position. The motion compensation CPU 20 includes a software routine which determines whether or not the deviation of the actual position and the target position (position instruction value) of the motion compensation lens 10 is smaller than a previously set threshold value. When the deviation is smaller than the predetermined value, the operational process proceeds to step S211. However, when the deviation is equal to or greater than the predetermined value, the operational process returns to step S209, and the motion compensation CPU 20 variably controls the servo gain until the deviation becomes small.

In step S211, the deviation of the virtual system is compared with a predetermined value to determine whether the deviation of the virtual system is less than the predetermined value. The motion compensation CPU 20 includes a software routine for determining whether or not the deviation of the actual position of the motion compensation lens 10 in the virtual system and the target position (position instruction value) is smaller than a previously set value. When the deviation is smaller than the predetermined value, the operational process proceeds to step S212. On the other hand, when the deviation is equal to or greater than the predetermined value, the operational process returns to step S209, and the motion compensation CPU 20 variably controls the servo gain until the deviation becomes small.

In accordance with the third embodiment of the present invention, the motion compensation CPU 20 includes a first threshold value, which is compared with the deviation at the time of half-depression actuation, and a second threshold value which is compared with the deviation when full-depression actuation occurs simultaneously with the half-depression actuation. In a single lens reflex camera, after confirming half-depression actuation on the viewfinder screen 84, the photographer performs exposure.

During half-depression actuation, it is necessary to control the motion compensation lens 10 such that the image does not move intermittently. However, because there is time until exposure, the motion compensation operation may be commenced comparatively slowly. On the other hand, when half-depression is actuated simultaneously with full-depression, exposure is immediately commenced, and it is preferable to commence motion compensation as quickly as possible even with some sacrifice of smoothness of movement of the image.

Moreover, in a lens shutter camera, the motion compensation operation is not confirmed in the viewfinder. Because of the motion compensation operation is not confirmed in the viewfinder, similarly to simultaneous half-depression actuation and full-depression actuation in a single lens reflex camera, it is preferable to commence the motion compensation operation quickly, even with some sacrifice of smoothness of movement of the image.

As a result, in accordance with the third embodiment of the present invention, the first threshold value is set to a smaller value than the second threshold value.

In step S212, the focal distance f and the photographic range are detected. The focal distance detection unit 42 detects the focal distance f, for example, with an encoder or the like disposed in the zoom ring. The lens CPU 100 communicates the focal distance information detected by the focal distance detecting unit 42 to the motion compensation CPU 20. The photo- graphic range is detected, for example, based on the rangefinding result of the AF sensor, calculated by a rotary encoder, or the like, which outputs a signal corresponding to the amount of extension of the focusing lens, or to the amount of rotation of the range ring, and which is communicated to the motion compensation CPU 20.

In step S213, the compensation coefficient a is calculated. The motion compensation CPU 20 calculates the compensation coefficient a according to the focal distance f.

In step S214, the position instruction value calculating unit 60 calculates the gain G based 101 on the focal distance f, the photographic range, and the compensation coefficient α.

In step S215, the position instruction value of the motion compensation lens 10 is changed from zero to the position instruction value calculated by the position instruction value calculating unit 60. The motion compensation CPU 20 instructs the position instruction value calculating unit 60 to change the position instruction value fixed at zero to the calculated position instruction value.

In step S216, the gain of the position instruction value calculating unit 60 is gradually increased. The motion compensation CPU 20 instructs the position instruction value calculating unit 60 to gradually increase the gain. The position instruction value calculating unit 60 controls the gain controller 62 to gradually increase the gain from zero.

In step S217, it is determined whether or not the gain of the position instruction value calculating unit 60 has become a calculated predetermined value. The motion compensation CPU 20 determines whether or not the gain of the position instruction value calculating unit 60 is the same as the predetermined value calculated in step S214. When the gain of the position instruction value calculating unit 60 is the same as the predetermined value, the operational process proceeds to step S218. When the gain of the position instruction value calculating unit 60 falls below the predetermined value, the operational process returns to step S216, and the position instruction value calculating unit 60 controls the gain controller 62 to further raise the gain.

In step S218, exposure is permitted and, in step S219, a half-depression timer is started. The body CPU 80 starts the half-depression timer (not shown in the drawing).

In step S220, it is determined whether or not the half-depression timer has timed out. The body CPU 80 determines whether or not a predetermined time of the half-depression timer has elapsed. When the half-depression timer has timed out, the operational process proceeds to step S221; when the half-depression timer has not timed out, the operational process proceeds to S225.

In step S221, it is determined whether or not the release switch 81 has been actuated in response to full depression of the release button. The body CPU 80 determines whether or not the release switch 81 has actuated in response to full depression. When the release switch 81 has been actuated fall-depression, the operational process proceeds to step S222. When the release switch 81 has not been actuated full depression, the operational process returns to step S220, and the body CPU 80 repeats the determination of whether or not the half-depression timer has timed out.

In step S222, the body CPU 80 instructs the mirror drive unit 88 to raise the mirror. The mirror drive unit 88 drives the quick return mirror 87 to the position shown by the dotted line in FIG. 4. Then, in step S223 exposure is commenced.

In step S224, the body CPU 80 instructs the mirror drive unit 88 to lower the mirror. The mirror drive unit 88 drives the quick return mirror from the dotted-line position to the full-line position. Then, in step S224, exposure ends.

In step S225, the gain of the position instruction value calculating unit 60 is set to zero. The motion compensation CPU 20 instructs the position instruction value calculating unit 60 such that the gain is set to zero by the gain controller 62. The position instruction value calculating unit 60 controls the gain controller 62 to set the position instruction value to zero.

In step S226, the servo gain is set to zero. The motion compensation CPU 20 sets the again of the control unit 23 to zero.

In step S227, the power supply to the driver 22 is actuated OFF. The motion compensation CPU 20 instructs the power supply circuit (not shown in the drawing) to stop the supply of power to the driver 22.

In step S228, the mechanical lock of the motion compensation lens 10 is actuated ON. The motion compensation CPU 20 instructs the fixing member to fix the motion compensation lens 10 in a predetermined position. The operations of the position instruction value calculating unit 60, the ideal drive current calculating unit 70, and motion compensation operation end, and the operational process then ends.

A description of the operation when motion compensation control becomes impossible in the motion compensation device in accordance with the third embodiment of the present invention will now be provided below.

Figure 9:
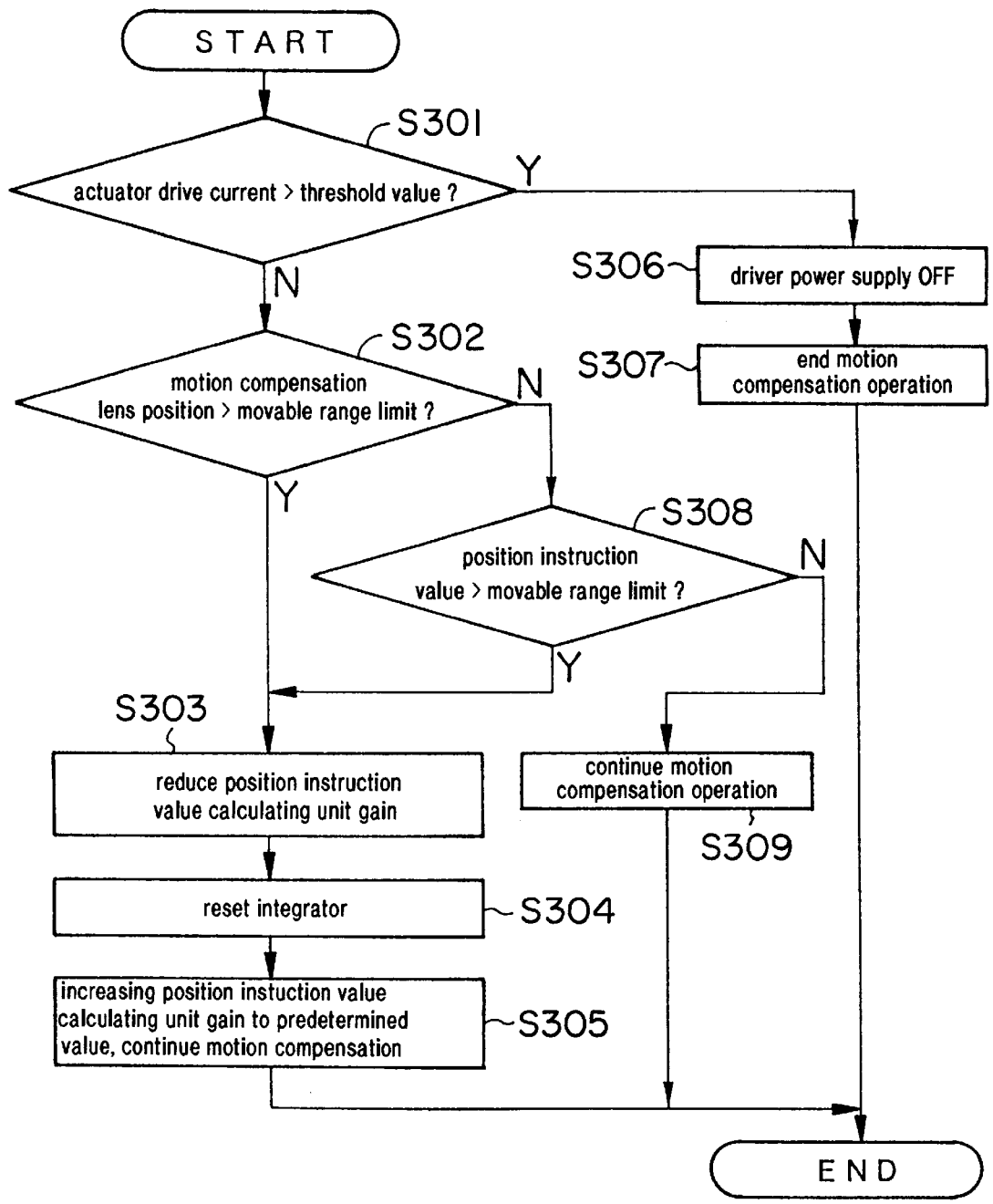
FIG. 9 is a flow chart illustrating an operational process for performing motion compensation when motion compensation control has become impossible in a motion compensation device in accordance with the third embodiment of the present invention.

FIG. 9 is a flow chart of an operational process when control becomes impossible in the motion compensation device in accordance with the third embodiment of the present invention.

In step S301, it is determined whether or not the drive current of the actuator 30 is greater than a threshold value. The motion compensation CPU 20 monitors the drive current flowing in the actuator 30. When the absolute value of the drive current, or the moving average of the absolute value of the drive current, is greater than a predetermined value for more than a predetermined time, the motion compensation CPU 20 determines that the motion compensation control is impossible. The position instruction value calculating unit 60 A/D converts the drive current so that the drive current can be detected by software. Even though a special current sensor or the like is not disposed to monitor the drive current, the position instruction value calculating unit 60 can monitor the drive current on the microcomputer. When the drive current of the actuator 30 is greater than the threshold value, the operational process proceeds to step S306; when the drive current of the actuator 30 falls below the threshold value, the operational process proceeds to step S302.

In step S302, it is detected whether or not the position of the motion compensation lens 10 is outside the limits of the movable range. The motion compensation CPU 20 monitors the position detection signal output by the position detection sensor 40, and determines whether or not the motion compensation lens 10 has reached the limits of the movable range. The motion compensation CPU 20 determines that motion compensation control is impossible when the motion compensation lens 10 is outside the limits of the movable range, or when the motion compensation lens 10 is outside the limits of the movable range while a predetermined time is exceeded. When the position of the motion compensation lens 10 is outside the limits of the movable range, the operational process proceeds to step S303; when the position of the motion compensation lens 10 falls within the movable range, the operational process proceeds to step S308.

In step S303, the gain of the position instruction value calculating unit 60 is reduced. The motion compensation CPU 20 instructs the position instruction value calculating unit 60 to reduce the gain, and the position instruction value calculating unit 60 controls the gain controller 62 to reduce the gain for a moment to zero.

In step S304, the integrator 61 is reset by the motion compensation CPU 20.

In step S305, the gain of the position instruction value calculating unit 60 is increased to a predetermined value, and motion compensation is continued. The motion compensation CPU 20 instructs the position instruction value calculating unit 60 to increase the gain, and the position instruction value calculating unit 60 controls the gain controller 62 to again raise the gain from zero to a predetermined value.

As a result, returning from the state in which motion compensation control is impossible to a normal state of motion compensation control, motion compensation control can be continued.

In step S306, the power supply to the driver 22 is actuated OFF, and in step S307, the motion compensation operation ends. The motion compensation CPU 20 instructs a power supply circuit (not shown in the drawing) to stop provision of a power supply to the driver 22, and the motion compensation operation ends.

In step S308, it is determined whether or not the position instruction value is outside the limits of the movable range of the motion compensation lens 10. The motion compensation CPU 20 monitors the position instruction value calculated by the position instruction value calculating unit 60, and determines whether or not the position instruction value has reached the limits of the movable range of the motion compensation lens 10. The position instruction value calculating unit 60 calculates the position instruction value on a microcomputer, and outputs through a D/A converter. Accordingly, the position instruction value calculating unit can monitor the position instruction value on the microcomputer, even without special hardware. The motion compensation CPU 20 determines that motion compensation control is impossible when the position instruction value is outside the limits of the movable range of the motion compensation lens 10, or when the position instruction value is outside the limits while a predetermined time is exceeded. When the position instruction value is outside the limits of the movable range of the motion compensation lens 10, the operational process proceeds to step S303. When the position instruction value falls within the limits of the movable range of the motion compensation lens 10, the operational process proceeds to step S309, and motion compensation is continued.

The motion compensation device in accordance with the third embodiment of the present invention has the following advantageous effects as discussed hereinbelow.

In accordance with the third embodiment of the present invention, the actuator 30, motion compensation lens 10 and lens frame 11 are used as an acceleration sensor. The ideal drive current calculating unit 70 includes a virtual system which behaves similarly to the actual system, and calculates an ideal drive current when there is no hand shake acceleration. The position instruction value calculating unit 60 calculates the difference between the drive current when the motion compensation lens 10 receives acceleration caused by motion and the ideal drive current, and calculates an acceleration signal which corresponds to hand shake acceleration.

Thus, in accordance with the third embodiment of the present invention, a motion compensation device is provided which detects motion, even without expensive special sensors such as angular velocity sensors or acceleration sensors, and can compensate for motion causing image blur with high precision.

As a result, an inexpensive camera can be manufactured including the motion compensation device.

Moreover, the embodiments of the present invention can reduce the power consumption because it is not necessary to provide a power supply for angular velocity sensors or acceleration sensors.

In accordance with the third embodiment of the present invention, an EEPROM 90 stores the characteristic angular frequency $\omega_n$, the attenuation constant $\zeta$, the actuator drive performance coefficient $\beta$, and temperature correction coefficients and the like relating to the actuator 30. Accordingly, the EEPROM 90 can store these constants at a time of adjustment or the like, and can accurately compensate for motion causing image blur in the high precision model in the ideal drive current calculating unit 70.

In accordance with the third embodiment of the present invention, the characteristic angular frequency $\omega_n$, the attenuation constant $\zeta$, and the actuator drive performance coefficient $\beta$ can be corrected by the ideal drive current calculating unit 70 based on the temperature information detected by the temperature detection unit 15 and the temperature correction coefficients stored in the EEPROM 90. Accordingly, by compensation of the constants stored in the EEPROM 90 at the time of adjustment, correcting the temperature characteristics according to the detected temperature, the ideal drive current calculating unit 70 can be made a high precision model.

In accordance with the third embodiment of the present invention, the gravitational acceleration unit 63 calculates the signal component corresponding to the gravitational acceleration, and the integrator 61 integrates the acceleration signal which corresponds to hand shake acceleration. Accordingly, a motion compensation device can be realized which is stabilized with respect to gravity and the like external disturbances.

Moreover, by utilizing an integrator which does not integrate a DC component or low frequency components, the gain of DC components can be kept low, and a stabilized motion compensation operation can be realized which does not easily diverge.

In accordance with the third embodiment of the present invention, upon receiving a motion compensation commencement signal, after the deviation of the actual position of the motion compensation lens 10 and the target position has been made smaller than a predetermined value, the control unit 3 drive controls the actuator 30 based on the position instruction value calculated by the position instruction value calculating unit 60.

Accordingly, motion compensation control is directly commenced at the starting time of the motion compensation operation, and motion compensation control can be prevented from becoming impossible, Furthermore, the motion compensation control can be stably performed and the motion compensation lens 10 can be smoothly started.

Moreover, when the time during which the deviation is smaller than the predetermined value is short, the motion compensation operation can be quickly commenced, and even if the time during which the deviation is smaller than the predetermined value is long, motion can be accurately compensated by waiting until the deviation becomes smaller than the predetermined value.

In accordance with the third embodiment of the present invention, a first threshold value is compared with the deviation between the actual position and the target position of the motion compensation lens 10 at the time of half-depression actuation, and a second threshold value is compared with the deviation when full-depression actuation occurs simultaneously with half-depression actuation. The smoothness of the movement of the motion compensation lens 10 at the motion compensation commencement time differs to the extent of the deviation between the actual position and the target position. Because of this, the motion compensation CPU 20 compares the deviation with the small value first threshold value at a time of half-depression actuation, and commences the motion compensation operation after the deviation becomes small, after some time has elapsed. As a result, intermittent driving of the motion compensation lens 10 can be reliably prevented.

Moreover, when the full-depression actuation is simultaneous with the half-depression actuation, the motion compensation CPU 20 compares the deviation with the second threshold value, which value is large. As a result, even if the deviation is more or less large, at a time the level is no problem for commencement of the motion compensation operation, by commencing the motion compensation operation, exposure can be quickly commenced.

In accordance with the third embodiment of the present invention, the position instruction value calculating unit 60 includes a gain controller 62 to varying the gain. When the deviation of the actual position of the motion compensation lens 10 from the target position becomes small, and motion compensation is commenced, for example, when the position instruction value suddenly changes stepwise, there is a possibility that motion compensation control becomes impossible. Accordingly, when motion compensation commences, the gain controller 62 continuously changes the gain from zero to a predetermined value at which compensation is sufficiently possible.

As a result, by gradually increasing the motion compensation effect such that motion compensation control does not become impossible, exposure can be commenced performing the motion compensation operation smoothly.

Moreover, the position instruction value calculating unit 60 detects with high precision accelerations applied to the motion compensation lens 10. Accordingly, there is a possibility that operation becomes unstable due to vibration and the like caused by lens driving when focusing.

Moreover, the gain G of the position instruction value calculating unit 60 changes according to the photographic range. In an interchangeable lens including a range encoder or the like, when lens driving has ended, the photographic range is known.

The position instruction value calculating unit 60 can commence motion compensation, increasing the gain with the gain controller 62, when lens driving has ended.

In accordance with the third embodiment of the present invention, after the gain of the position instruction value calculating unit 60 is temporarily reduced to zero when motion compensation control is impossible, the gain is raised again to a predetermined value. For example, when the attitude of the camera changes suddenly, the position of the motion compensation lens 10 exceeds the limits of the movable range, and there is a possibility that motion compensation control becomes impossible.

Because of this, the motion compensation CPU 20 instructs the position instruction value calculating unit 60 to temporarily make the gain zero, and after the actuator 30 has returned the motion compensation lens 10 to the zero position, instructs the position instruction value calculating unit 60 to increase the gain again.

As a result, even if motion causing image blur cannot be compensated because motion compensation control has become impossible, for whatever cause, a normal state can be quickly restored from the state in which motion compensation control is impossible, and motion compensation can be quickly recommenced.

The motion compensation device in accordance with the third embodiment of the present invention includes a display unit 82 for the photographer to know when motion compensation is sufficiently performed. When the deviation of the actual position of the motion compensation lens 10 and the position instruction value is greater than a predetermined value, when the gain is gradually increased, a time at which motion compensation control is impossible, when the motion compensation lens 10 has struck the limit member and the like, motion cannot be compensated. The motion compensation CPU 20, for example, actuating ON a mode switch (not shown in the drawing), and when the gain of the position instruction value calculating unit 60 is raised as far as a predetermined value, it can be determined that the motion compensation operation is normal.

When the motion compensation operation is normal, the display unit 82 displays in the viewfinder screen to this effect, and the photographer can perform photography while confirming that the motion compensation operation is performed.

Fourth Preferred Embodiment

Figure 10:
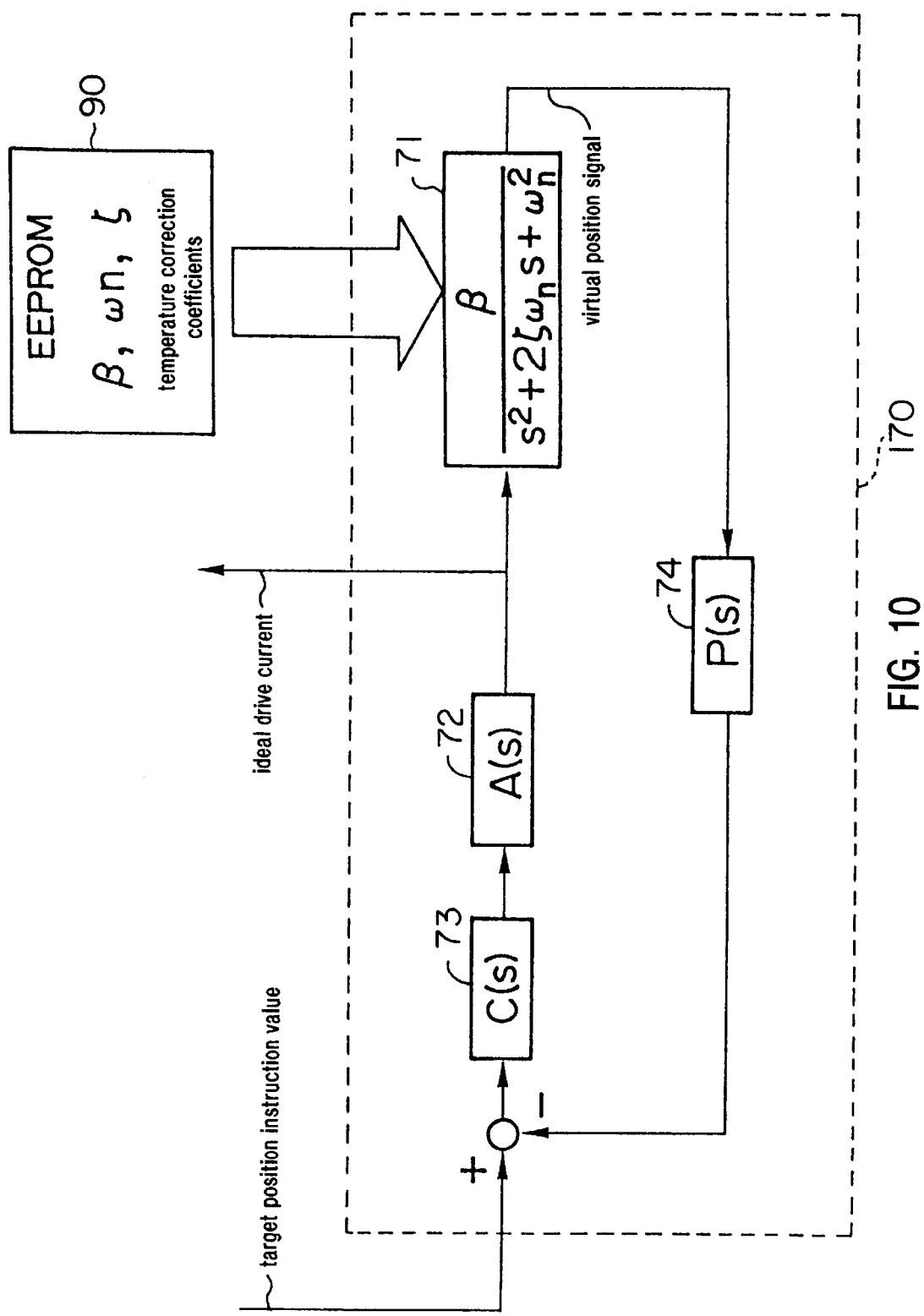
FIG. 10 is a block diagram of an ideal drive current calculating unit in a motion compensation device in accordance with a fourth embodiment of the present invention.

FIG. 10 is a block diagram of an ideal drive current calculating unit in a motion compensation device in accordance with a fourth embodiment of the present invention. Elements which are the same as those shown in FIGS. 4–7 are referred to by the same reference symbols and numerals, and a detailed description of these like elements will not be repeated here.

The motion compensation device in accordance with the fourth embodiment of the present invention uses a current driver which outputs a current proportional to the input voltage, and differs from the driver 22 in accordance with the first embodiment of the invention, shown in FIGS. 4 and 5 which uses a PWM driver.

When a current driver is used in the driver 22, taking no account of back electromotive force, the model of the ideal drive current calculating unit 170 can operate. This model can be represented by constants only.

In accordance with the fourth embodiment of the present invention, because a current driver is used in place of a PWM driver, the reverse voltage model 75 shown in FIG. 6 can be omitted.

Moreover, because a drive current can be used as the signal which is input to the driver, the drive current measuring device 50 shown in FIGS. 4 and 5 becomes unnecessary, and the motion compensation device can have a simple construction.

Fifth Preferred Embodiment

Figure 11:
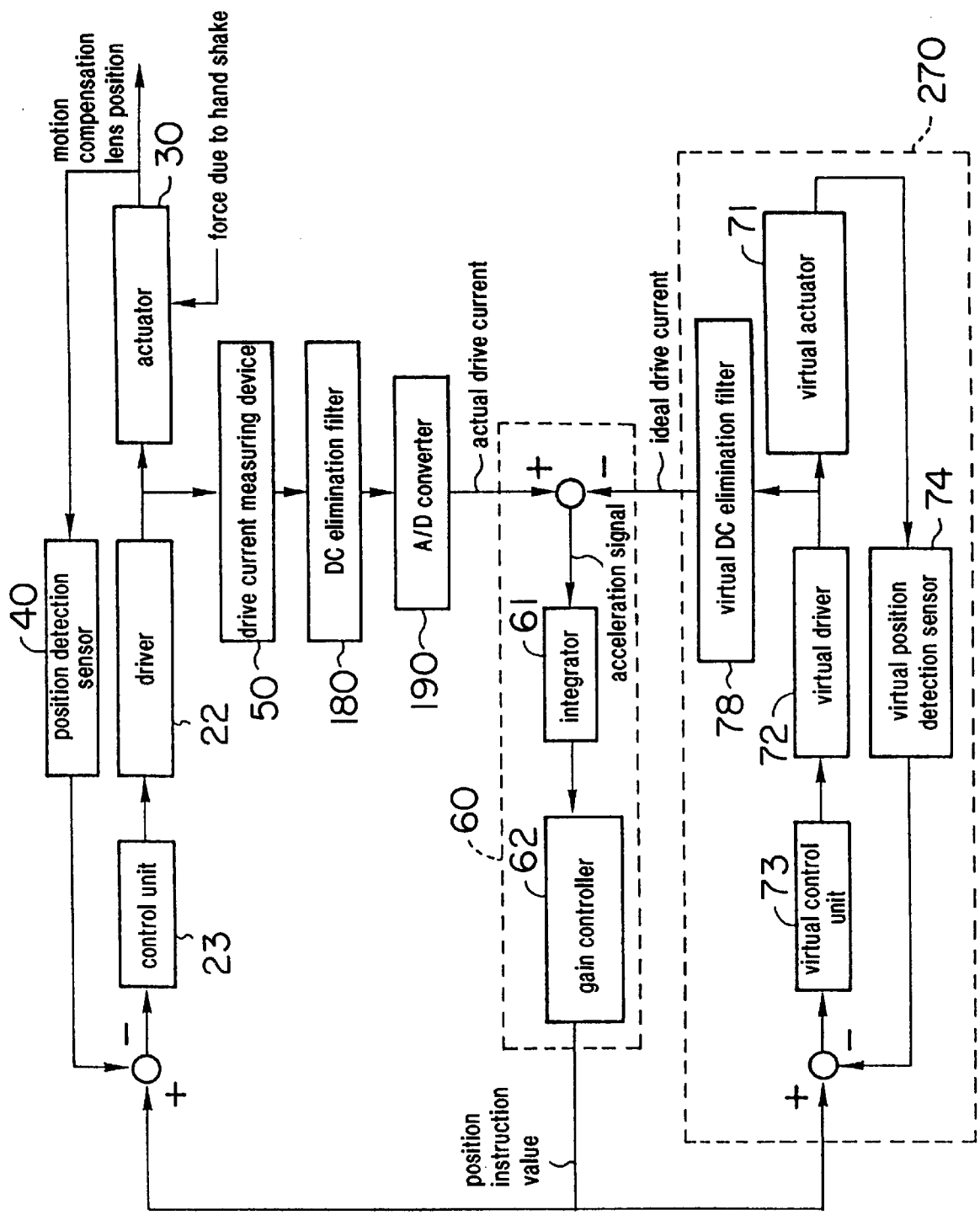
FIG. 11 is a block diagram of a motion compensation device in accordance with a fifth embodiment of the present invention.

FIG. 11 is a block diagram of a motion compensation device in accordance with a fifth embodiment of the present invention. Elements which are the same as those shown in FIGS. 4–7 are referred to by the same reference symbols and numerals, and a detailed description of these like elements will not be repeated here.

The motion compensation device in accordance with the fifth embodiment of the present invention differs from the third embodiment and fourth embodiment, and extracts an acceleration component caused by hand shake from the drive current of the actuator 30 which includes an acceleration component occurring as a result of gravity.

The motion compensation device in accordance with the third embodiment of the present invention compensates for motion detecting acceleration caused by hand shake, and strongly receives effects of gravitational acceleration. Because gravitational acceleration is greater by far than the acceleration caused by hand shake, the component of gravitational acceleration in the direction of driving of the motion compensation lens 10 receives changes of a magnitude which are not negligible in comparison with those caused by slight changes in the attitude of the camera. Because of this, the drive current of the actuator 30 receives large changes, and a minute signal caused by hand shake becomes buried in a large signal caused by gravity.

A DC elimination filter 180, considering the acceleration component which changes at a low frequency to be a component caused by gravity, is a DC elimination filter for the drive current of the actuator 30. The DC elimination filter 180 is, for example, an analog filter comprising op amps, resistors and capacitors. An ΔID converter 190 A/D converts the output signal of the DC elimination filter 180.

Moreover, an ideal drive current calculating unit 270 includes a virtual DC elimination filter 78 which has characteristics similar to the true DC elimination filter 180.

The motion compensation device in accordance with the fifth embodiment of the present invention has the following advantageous effects, in addition to the effects of the third embodiment and fourth embodiment.

In accordance with the fifth embodiment of the present invention, a DC component is eliminated from the drive current by a DC elimination filter 180 before the drive current of the actuator 30 is A/D converted by the A/D converter 190. When the drive current of the actuator 30 is A/D converted without removal of the DC component, an A/D converter having a very high dynamic range becomes necessary to detect the acceleration signal caused by hand shake, which is buried in the gravitational acceleration.

In accordance with the fifth embodiment of the present invention, because A/D conversion is performed after the elimination of the DC component, the gravitational component can largely be eliminated, and in addition is advantageous from the cost aspect and the aspect of conversion speed. Moreover, because only the small signal caused by hand shake is A/D converted, there is the advantage of an increase in A/D conversion accuracy, and it is not necessary to use an lot A/D converter having a large dynamic range, which is expensive and has a slow conversion speed.

In accordance with the fifth embodiment of the present invention, the ideal drive current calculating unit 270 includes a virtual DC elimination filter 78, and the model in the ideal drive current calculating unit 270 can be the same as the servo circuit of the actual actuator 30 and control unit 23.

Sixth Preferred Embodiment

Figure 12:
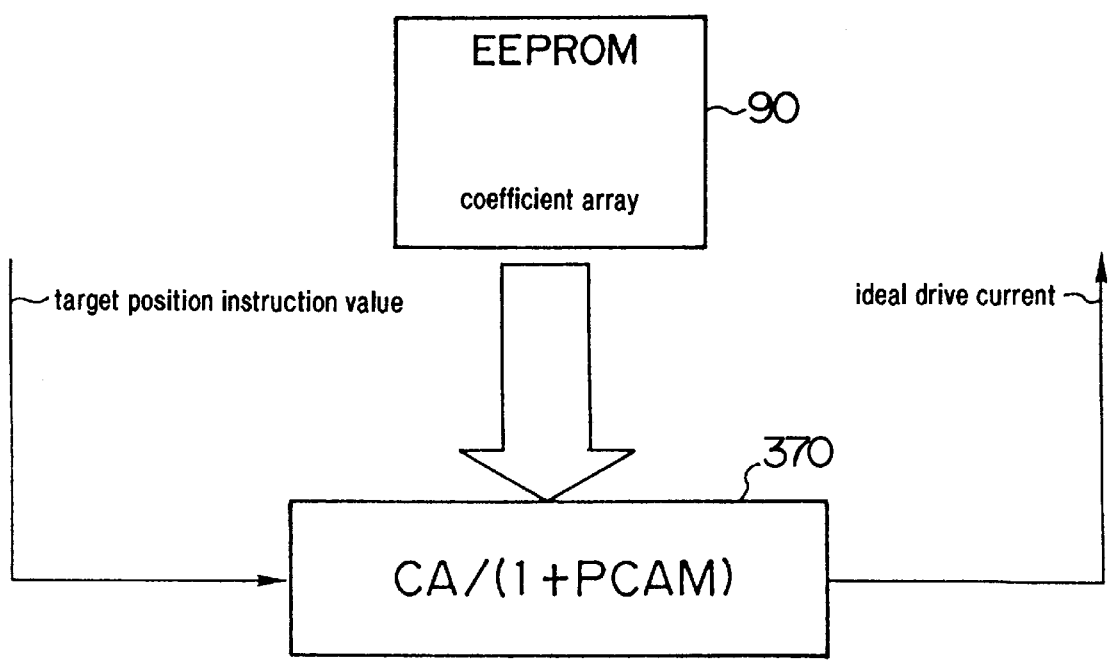
FIG. 12 is a block diagram of an ideal drive current calculating unit in a motion compensation device in accordance with a sixth embodiment of the present invention.

FIG. 12 is a block diagram of an ideal drive current calculating unit in a motion compensation device in accordance with a sixth embodiment of the present invention. Elements which are the same as those shown in FIGS. 4–7 are referred to by the same reference symbols, and a detailed description of these like elements will not be repeated here.

The motion compensation device in accordance with to the sixth embodiment of the present invention differs from the third through fifth embodiments. In accordance with the sixth embodiment, the actuator 30, driver 22, control unit 23 and position detection sensor 40 and the like are linked together, and represented in software, collected into one unit.

The ideal drive current calculating unit 370, representing the model as shown in FIG. 12, calculates the ideal drive current with a microprocessor or the like. In this case, the characteristics with which the whole model is equipped are shown by transfer coefficients. The constants of the respective blocks, using the transfer coefficients, can be represented by the following Equation (11) after a Laplace transformation.

$$F(s) = CA/(1+PCAM) \tag{Eq. 11}$$

In Equation (11), F(s) is the transfer coefficient of the ideal drive current calculating unit 370; C is the transfer coefficient of the control unit; M is the transfer coefficient of the actuator; A is the transfer coefficient of the driver; and P is a constant of the position detection sensor.

In accordance with the sixth embodiment of the present invention, a model is provided such that the frequency characteristics found from these transfer coefficients have the same frequency characteristics as the frequency band which the hand shake compensation uses. The ideal drive current calculating unit 370 performs a calculation arranged in a form similar to a digital filter having the characteristics shown in Equation 10. In this case, the ideal drive current calculating unit 370 inputs sampled position instruction values, and outputs an ideal drive current. The ideal drive current calculating unit 370 represents a digital filter by a series of coefficients of some kind, which represent its characteristics. The ideal drive current calculating unit 370 selects and stores these series of coefficients in the EEPROM 90 to suit the characteristics of the actual system including the actuator 30, reads out these series during motion compensation, and calculates the ideal drive current.

In accordance with the sixth embodiment of the present invention, because the whole model is collected into one representation, a compact model is provided as one block, and the calculation speed can be increased.

Seventh Preferred Embodiment

Figure 13:
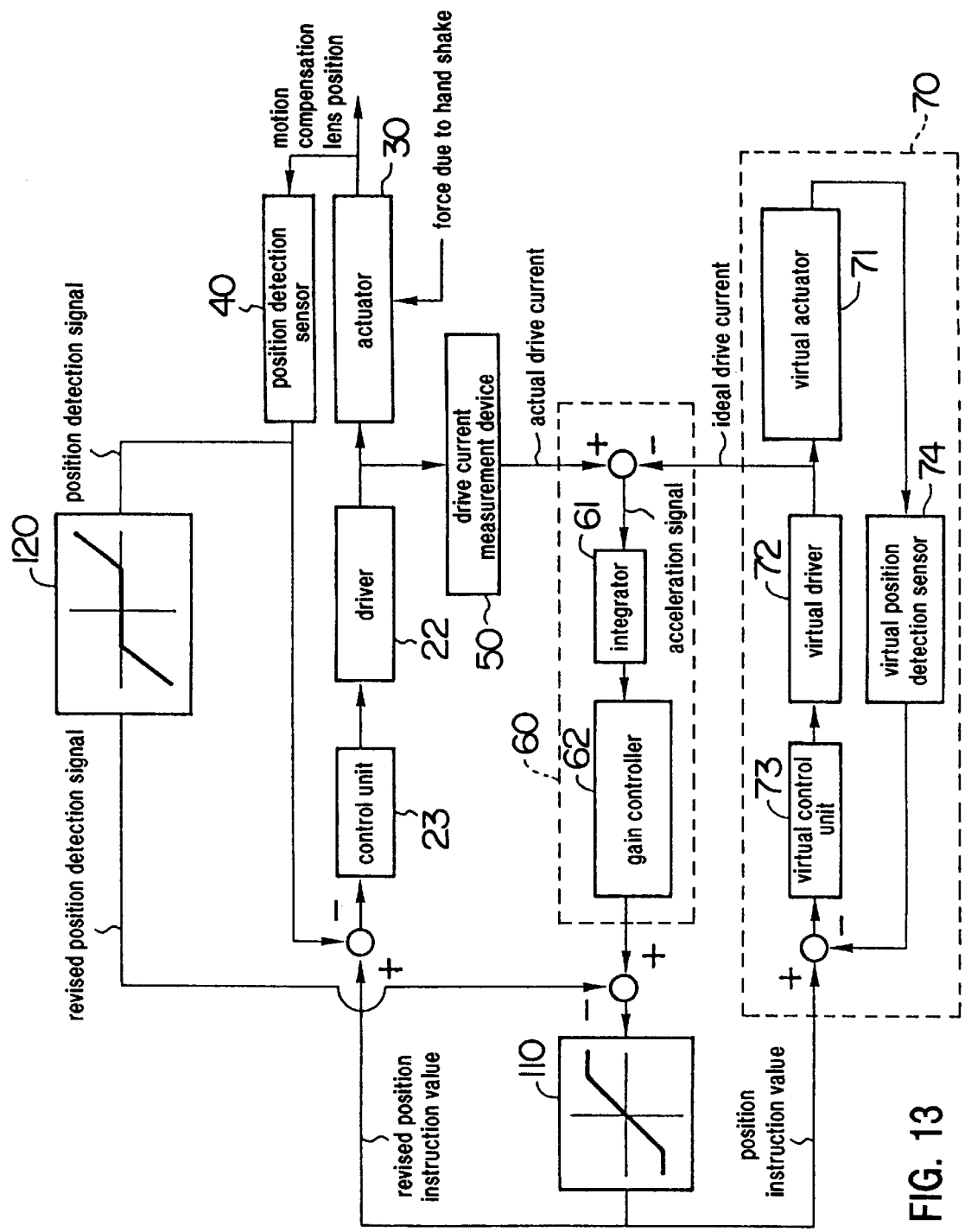
FIG. 13 is a block diagram of a motion compensation device in accordance with a seventh embodiment of the present invention.

FIG. 13 is a block diagram of a motion compensation device in accordance with a seventh embodiment of the present invention. Elements which are the same as those shown in FIGS. 4-7 are referred to by same reference symbols, and a detailed description of the like elements will not be repeated here.

The seventh embodiment of the present invention differs from the third through sixth embodiment examples, and includes a soft limit unit 110 and a centering bias table unit 120.

The soft limit unit 110 revises the position instruction value in order to drive the motion compensation lens 10 within a range narrower than its movable range. When a position instruction value has been input which exceeds some range, the soft limit unit 110 revises the position instruction value so as to become saturated and outputs the revised position instruction value. The soft limit unit 110 simultaneously outputs the same value of the revised position instruction value to the control unit 23 and to the ideal drive current calculating unit 70. The control unit 23 drive controls the actuator 30 based on this revised position instruction value, and the ideal drive current calculating unit 70 calculates an ideal drive current based on the position instruction value.

When a position detection signal has been input which exceeds some range, the centering bias table 120 revises the position detection signal so that it drives the motion compensation lens 10 to a center of or close to the center of the movable range, and outputs the revised position detection signal. As shown in FIG. 13, when an input position detection signal is within a predetermined range, the centering bias table 120 outputs a revised position detection signal of zero. When an input position detection signal exceeds a predetermined range, the centering bias table 120 outputs a revised position detection signal, gradually making the revised position detection signal a large value. The centering bias table 120 outputs to the soft limit unit 10, as a position instruction value, a signal comprising the revised position detection signal subtracted from the output signal of the gain controller 62.

The motion compensation device in accordance with the seventh embodiment of the present invention has the following advantageous effects, in addition to the effects of the third through sixth embodiments.

In accordance with the seventh embodiment of the present invention, the actuator 30, motion compensation lens 10 and lens frame 11 are conjointly used as an angular velocity sensor. Therefore, it is necessary for the actual system and the virtual system to follow in the same manner with respect to the same target position. However, the actual system includes mechanical limiting members in limits of the movable range of the motion compensation lens 10 and when the amplitude of the position instruction value exceeds these limits, the motion compensation lens 10 strikes against the limiting members.

As a result, because the operation of the actual system and the virtual system is completely different, they cannot detect acceleration, and the motion compensation operation becomes impossible.

In accordance with the seventh embodiment of the present invention, the motion compensation device includes the soft limit unit 110, which limits the position instruction value to a fixed level (clips at some value) before the motion compensation lens 10 strikes against the limiting member. Because of this, the motion compensation lens 10 can be driven within a narrower range than the movable range. As a result, in order for the operation of the actual system and the virtual system to be the same, the soft limit unit 110 prevents the motion compensation lens from striking the limiting members and prevents the motion compensation operation from becoming impossible.

In accordance with the seventh embodiment of the present invention, the central bias table 120 restores the motion compensation lens 10 to the center, or close to the center, of the movable range, when the motion compensation lens 10 is close to the limits of the movable range before the position instruction value is revised by the soft limit unit 100. Accordingly, intermittent, unnatural movement of the image in the viewfinder screen 84 can be made small.

Various modifications to the present invention are possible without departing from the spirit or principal characterizing features of the invention. The embodiments described hereinabove are not to be interpreted as limiting. The modifications or alterations to the preferred embodiments described below are all within the scope of the invention provided in the claims.

The drive current measuring devices 5, 50 are not limited to direct detection of the drive current, and may indirectly detect the drive current. Moreover, the drive current measuring device 50 may measure the drive current by using a current sensor, or may detect a voltage.

Figure 3:
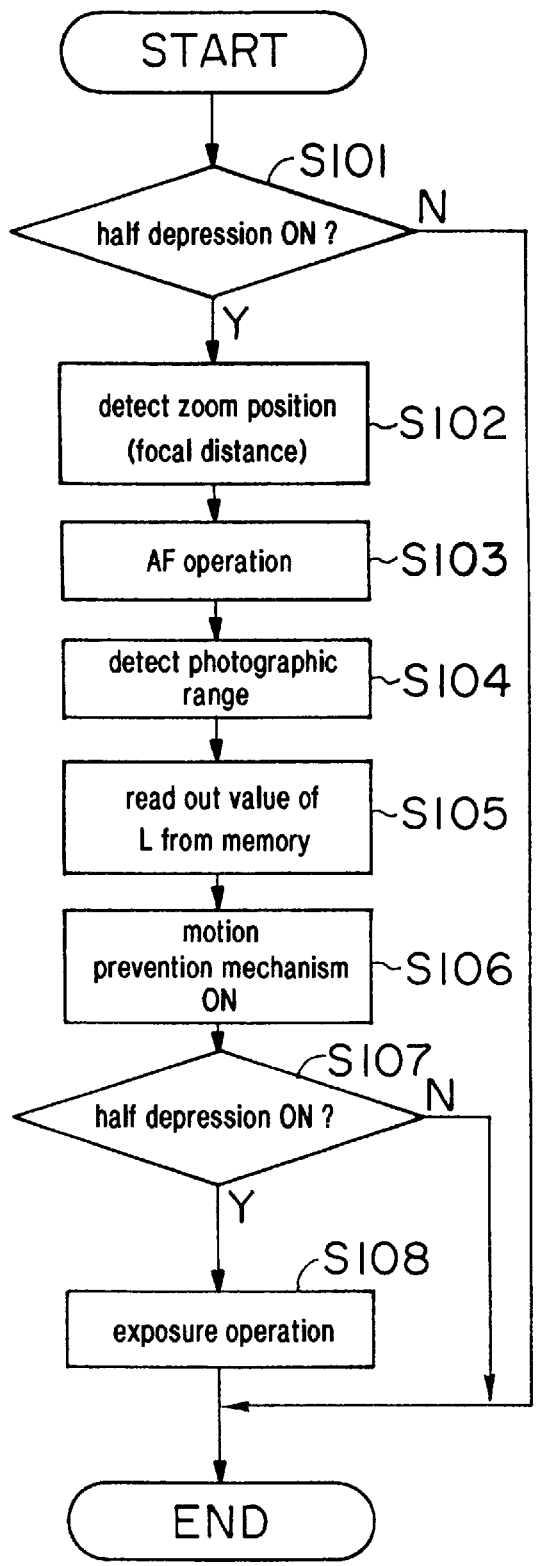
FIG. 3 is a flow chart of an operational process for performing motion compensation with the motion compensation device in accordance with the first and second embodiments of the present invention.

The motion compensation operation is not limited to the operational process shown in the flow chart shown of FIG. 3. Moreover, step S104 which detects the photographic range and step S102 which detects the zoom position (focal distance) may be performed at other points in the operational process.

In accordance with the embodiments of the invention described hereinabove, the position instruction value calculating unit 60, after the integration by the integrator 61, gain is applied by the gain controller 62. However, the order of the integration and the gain may be reversed.

The ideal drive current calculating units 7, 70, 170, 270, 370 may comprise op amps and the like analog devices. The ideal drive current calculating units 7, 70, 170. 270, 370 when the model is represented as an analog circuit, the calculating circuits corresponding to the actuator 30, driver 22, control unit 23 and position detection sensor 40 may be represented with respective op amps, and can be connected together in the form of a feedback loop.

Moreover, the ideal drive current calculating units 7, 70, 170, 270, 370 input position instruction values to the calculating circuit, and can represent by extracting signals which represent drive current.

As shown by Equation (4), the ideal drive current calculating units 7, 70, 170, 270, 370, have been described with reference to a second order delay system model; however, the delay system model may be a model of third or more order delay system model.

Moreover, the ideal drive current calculating units 7, 70, 170. 270, 370 may partially perform corrections based on the temperature detected by the temperature detection unit 15 and on temperature correction coefficients, characteristic angular frequency $\omega_n$, attenuation coefficients $\zeta$, an actuator drive performance coefficient $\beta$ and the like.

The DC elimination filter 180 may be a digital filter comprising software, and may eliminate the DC component after the drive current of the actuator has been A/D converted.

Moreover, instead of the DC elimination filter 180, assuming a calculation of the drive current due to gravity, the signal component due to gravity may be subtracted from the drive current of the actuator 30. In this case, the signal component due to gravity estimated in software may be output as an analog value by a D/A converter, and after subtracting the analog signal of the component due to gravity from the drive current of the actuator 30, the resulting signal may be A/D converted. Furthermore, the component due to gravity after D/A conversion may be subtracted in software from the drive current of the actuator 30.

An algorithm which estimates the signal component due to gravity, with more degrees of freedom when constituted by software rather than by the DC elimination filter 180, is a possibility which can effectively subtract the component due to gravity. Because the deviation of the actual position of the motion compensation lens 10 and the position instruction value is slight even in the state due to gravity added by servo, an algorithm which estimates the signal component due to gravity, for example, the magnitude seen in the direction of the deviation, is a method which can estimate the signal component due to gravity.

The EEPROM 90 may be a flash memory, a PROM, an EPROM, and the like non-volatile memory having rewriteable memory elements.

Instead of the centering bias table 120 shown in FIG. 13, the centering bias table may be one which outputs a revised position detection signal by performing calculation.

The motion compensation CPU 20 determines whether or not the deviation of the actual position of the motion compensation lens 10 and the position instruction value is smaller than a predetermined value. However, the motion compensation CPU 20 may determine whether or not a predetermined time has elapsed from the receipt of the motion compensation commencement signal.

In the case that the motion compensation CPU 20 determines whether or not a predetermined time has elapsed from receipt of the motion compensation system, not immediately commencing motion compensation from receipt of the motion compensation commencement signal, a predetermined time from receipt of the motion compensation commencement signal, fixes the position instruction value at zero. Then, closing the feedback system(s) of the actual system and the virtual system, after a predetermined time has elapsed, changing over the position instruction value which was fixed at zero, to the position instruction value which the position instruction value calculating unit 6 calculated, commences motion compensation.

In accordance with the present invention, the gain controller 62 changes the gain between a predetermined value which the position instruction value calculating unit 60 calculated and zero. However, there is no limit to changing the gain to zero and the gain may be variable between another small value and the predetermined value.

Moreover, in step S306 shown in FIG. 9, when the drive current of the actuator 30 is above a threshold value, the power supply to the driver 22 is actuated OFF. However, there is no limitation to actuating the driver 22 off when the drive current of the actuator 30 is above the threshold value.

For example, the motion compensation CPU 20 instructs the position instruction value calculating unit 60 to decrease the gain to zero, and the process may be performed in step S303 and thereafter.

In accordance with the third through seventh embodiments of the present invention, a description was provided of examples of a camera including a body CPU 80, a lens side CPU 100, and a motion compensation CPU 20. However, each respective CPU may be used conjointly with another CPU. For example, for a camera type with integral lens and body, one CPU may be provided with all the functions.

Moreover, the embodiments of the present invention are described hereinabove in terms of a single lens reflex camera having a motion compensation device. However, the invention can be applied to an integral lens type of camera or a digital camera.

Furthermore, the present invention can also be applied to video cameras, binoculars, and the like optical devices.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A motion compensation device, comprising
   a motion compensation optical system to compensate for motion causing image blur;
   a drive unit to drive the motion compensation optical system;
   a drive signal detection unit to detect a drive signal when the motion compensation optical system receives an acceleration caused by motion; and
   a control unit to control the drive unit based on the drive signal.

2. A motion compensation device as recited in of claim 1, wherein
   the drive unit generates a drive force by passing an electric current through a magnetic field, and
   the drive signal detection unit detects, as the drive signal, the electric current when the motion compensation optical system receives an acceleration caused by motion.

3. A motion compensation device as recited in claim 1, further comprising:
   a calculating unit to calculate a target drive position of the motion compensation optical system based on the drive signal and to output a target drive position signal,
   wherein the calculating unit controls the drive unit based on the target drive position signal.

4. A motion compensation device as recited in claim 3, wherein the calculating unit comprises:
   a first calculating unit to calculate the target drive position of the motion compensation optical system and to output the target drive position signal; and
   a second calculating unit to calculate an ideal drive signal of the motion compensation optical system and to output the ideal drive signal, wherein the first calculating unit calculates the target drive position signal based on the drive signal and the ideal drive signal.

5. A motion compensation device as recited in claim 4, wherein the first calculating unit calculates the acceleration of the motion compensation optical system based on the drive signal and the ideal drive signal.

6. A motion compensation device as recited in claim 4, wherein the second calculating unit outputs, as the ideal drive signal, the current when the motion compensation optical system does not receive an acceleration caused by motion, and the first calculating unit calculates the acceleration of the motion compensation optical system from the difference between the drive signal and the ideal drive signal.

7. A motion compensation device as recited in claim 3, wherein the calculating unit calculate s the target drive position signal according to movement of the motion compensation optical system in the optical axis direction.

8. A motion compensation device as recited in claim 3, wherein the calculating unit calculates the target drive position signal according to a distance between a center of rotation of motion and a position of the motion compensation optical system in the optical axis direction.

9. A motion compensation device as recited in claim 8, wherein the center of rotation of motion is positioned between a centroid of the optical device and an imaging plane.

10. A motion compensation device as recited in claim 3, wherein the calculating unit calculates the target drive position signal according to the photographic range.

11. A motion compensation device, comprising:

a motion compensation optical system to compensate for motion causing image blur;

a drive unit to drive the motion compensation optical system;

a drive signal detection unit to detect a drive signal when the motion compensation optical system receives acceleration caused by the motion causing image blur;

an ideal drive signal calculating unit to calculate an ideal drive signal when the motion compensation optical system does not receive an acceleration caused by the motion causing image blur;

a position instruction value calculating unit to calculate a position instruction value based on the drive signal and the ideal drive signal;

a control unit to control the drive unit based on the position instruction value; and a memory unit to store at least one of constants and coefficients to calculate the ideal drive signal, wherein the ideal drive signal calculating unit calculates the ideal drive signal based on at least one of the constants and coefficients and the position instruction value.

12. A motion compensation device as recited in claim 11, wherein the memory unit stores characteristic angular vibration constants, attenuation constants, and drive performance constants relating to the drive unit.

13. A motion compensation device as recited in claim 11, wherein the motion compensation device further comprises:

a temperature detection unit to detect the temperature, wherein the memory unit stores temperature compensation coefficients, the ideal drive signal calculating unit calculates the ideal drive signal, and corrects at least a portion of the constants and the coefficients based on the temperature detected by the temperature detection unit and the temperature compensation coefficient.

14. A motion compensation device as recited in claim 11, wherein the memory unit stores coefficients relating to frequency characteristics of the ideal drive signal calculating unit.

15. A motion compensation device as recited in claim 11, wherein the memory unit is a rewriteable memory element.

16. A motion compensation device as recited in claim 11, further comprising:

a filter unit to remove from the drive signal, signals arising when the motion compensation optical system receives gravitational acceleration, wherein the position instruction value calculating unit calculates the position instruction value based on the output signal of the filter unit and on the ideal drive signal.

17. A motion compensation device as recited in claim 16, wherein the filter unit is a DC cutoff filter to remove a direct current component, including an ΔID converter to A/D convert the output signal of the DC cutoff filter, wherein the position instruction value calculating unit calculates the position instruction value based on the output signal of the A/D converter and on the ideal drive signal.

18. A motion compensation device as recited in claim 11, further comprising:

an integrating unit to integrate the drive signal and the ideal drive signal only in a hand shake frequency region, and not to integrate a DC component and a low frequency signal caused by a gravitational acceleration, wherein the position instruction value calculating unit calculates the position instruction value based on the output signal of the integrating unit.

19. A motion compensation device as recited in claim 11, wherein the position instruction value calculating unit inputs the same value simultaneously to the control unit and to the ideal drive signal calculating unit.

20. A motion compensation device as recited in claim 11, further comprising:

a position instruction revision unit to revise the position instruction value and to output a revised position instruction value, wherein the control unit controls driving of the motion compensation optical system by the drive unit in a range narrower than the limits of movement of the motion compensation optical system, based on the revised position instruction value.

21. A motion compensation device as recited in claim 20, wherein the position instruction revision unit inputs the same revised position instruction value simultaneously to the control unit and to the ideal drive signal calculating unit.

22. A motion compensation device as recited in claim 11, further comprising:

a position detection unit to detect the drive position of the motion compensation optical system and to output a position detection signal; and a drive position revision unit to revise the position instruction value based on the position detection signal and to output a revised position instruction value, wherein the control unit controls the drive unit to drive the motion compensation optical system at or near a center of a movable range of the motion compensation optical system based on the revised position instruction value.

23. A motion compensation device as recited in claim 22, wherein the drive position revision simultaneously inputs the same revised position instruction value simultaneously to the control unit and to the ideal drive signal calculating unit.

24. A motion compensation device, comprising:

a motion compensation optical system to compensate for motion causing image blur;

a drive unit to drive the motion compensation optical system;

a drive signal detection unit to detect a drive signal when the motion compensation optical system receives acceleration caused by the motion causing image blur;

an ideal drive signal calculating unit to calculate an ideal drive signal when the motion compensation optical system does not receive an acceleration caused by motion;

a position instruction value calculating unit to calculate a position instruction value based on the drive signal and the ideal drive signal; and a control unit to control the drive unit based on the position instruction value, wherein the ideal drive signal calculating unit represents a model of the drive unit described as an at least second order delay system, and the ideal drive signal calculating unit calculates the ideal drive signal based on the position instruction value.

25. A motion compensation device as recited in claim 24, wherein the ideal drive signal calculating unit represents a model of the drive unit using characteristic angular vibration number, attenuation constants, and drive performance coefficients.

26. A motion compensation device as recited claim 24, further comprising:

a filter unit to remove from the drive signal, signals arising when the motion compensation optical system receives a gravitational acceleration, wherein the position instruction value calculating unit calculates the position instruction value based on the output signal of the filter unit and on the ideal drive signal.

27. A motion compensation device as recited in claim 26, wherein the filter unit is a DC cutoff filter to remove direct current components, including an A/D converter to A/D convert the output signal of the DC cutoff filter, and the position instruction value calculating unit calculates the position instruction value based on the output signal of the A/D converter and on the ideal drive signal.

28. A motion compensation device as recited in claim 24, further comprising:

an integrating unit to integrate the drive signal and the ideal drive signal only in a hand shake frequency region, and not to integrate a DC component and a low frequency signal caused by a gravitational acceleration, wherein the position instruction value calculating unit calculates the position instruction value based on the output signal of the integrating unit.

29. A motion compensation device as recited in claim 24, wherein the position instruction value calculating unit inputs the same position instruction value simultaneously to the control unit and to the ideal drive signal calculating unit.

30. A motion compensation device as recited in claim 24, further comprising:

a position instruction value revision unit to revise the position instruction value and to output a revised position instruction value, wherein the control unit controls the drive unit to drive the motion compensation optical system in a narrower range than the limits of possible movement of the motion compensation optical system based on the revised position instruction value.

31. A motion compensation device as recited in claim 30, wherein the position instruction value revision unit simultaneously inputs the same revised position instruction value to the control unit and to the ideal drive signal calculating unit.

32. A motion compensation device as recited in claim 24, further comprising:

a position detection unit to detect a drive position of the motion compensation optical system and to output a position detection signal;

a drive position revising unit to revise the position instruction value based on the position detection signal and to output a revised position instruction value, wherein the control unit controls the drive unit to drive the motion compensation optical system at or near a center of a possible range of movement of the motion compensation optical system, based on the revised position instruction value.

33. A motion compensation device as recited in claim 32, wherein the drive position revising unit inputs the same revised position instruction value to the control unit and to the ideal drive signal calculating unit.

34. A motion compensation device, comprising a motion compensation optical system to compensate for motion causing image blur;

a drive unit to drive the motion compensation optical system;

a drive signal detection unit to detect the drive signal when the motion compensation optical system receives an acceleration caused by motion;

an ideal drive signal calculating unit to calculate an ideal drive signal when the motion compensation optical system has not received an acceleration caused by motion;

a position instruction value calculating unit to calculate a position instruction value based on the drive signal and the ideal drive signal;

a control unit to control the drive unit based on the position instruction value; and a compensation commencement generating unit to generate a motion compensation commencement signal, wherein the ideal drive signal calculating unit calculates the ideal drive signal based on the position instruction value, and the control unit commences drive control of the drive unit based on the position instruction value, after a predetermined time has elapsed from receiving the motion compensation commencement signal.

35. A motion compensation device as recited in claim 34, wherein the position instruction value calculating unit outputs a position instruction value of zero or a fixed value within a predetermined time from receiving the motion compensation commencement signal.

36. A motion compensation device as recited in claim 34, further comprising:

a position detection unit to detect a drive position of the motion compensation optical system; and a decision unit to decide whether or not the deviation of the drive position and the position instruction value is smaller than a predetermined value.

37. A motion compensation device as recited in claim 36, wherein the control unit controls the drive unit based on the position instruction value when the deviation is smaller than the predetermined value, and outputs a zero or a constant position instruction value when the deviation is greater than the predetermined value.

38. A motion compensation device as recited in claim 36, wherein the predetermined value comprises a first predetermined value which is compared with the deviation during photographic preparation, and a second predetermined value which is compared with the deviation during photography, the photographic preparation operations not having elapsed, wherein the first predetermined value is smaller than the second predetermined value.

39. A motion compensation device as recited in claim 34, further comprising:

a gain varying unit to vary the gain of the position instruction calculating unit.

40. A motion compensation device as recited in claim 39, wherein the gain varying unit increases the gain of the position instruction value calculating unit from zero or a constant value after receipt of a motion compensation commencement signal.

41. A motion compensation device as recited in claim 39, wherein the gain varying unit reduces the gain of the position instruction value calculating unit to zero or a constant value when in a state in which motion compensation is impossible.

42. A motion compensation device as recited in claim 41, wherein the gain varying unit reduces the gain of the position instruction value calculating unit to zero or a constant value when the motion compensation optical system reaches a limit of possible movement.

43. A motion compensation device as recited in claim 41, wherein the gain varying unit reduces the gain of the position instruction value calculating unit to zero or a constant value when the drive current flowing in the drive unit is greater than a predetermined electric current value, or when the voltage of the power supply providing electric current to the drive unit is smaller than a predetermined voltage value.

44. A motion compensation device as recited in claim 41, wherein the control unit causes a stoppage of supply of electric current to the drive unit when the current flowing in the drive unit is greater than a predetermined electric current value, or when the voltage of the power supply providing electric current to the drive unit is smaller than a predetermined voltage value.

45. A motion compensation device as recited in claim 34, further comprising:

a display unit to display information relating to the state of the motion compensation operation.

\* \* \* \* \*